United States Patent
Vogl et al.

(10) Patent No.: US 11,745,459 B2
(45) Date of Patent: *Sep. 5, 2023

(54) THIN GLASS SUBSTRATE, IN PARTICULAR A BOROSILICATE GLASS THIN GLASS SUBSTRATE, METHOD AND APPARATUS FOR ITS PRODUCTION

(71) Applicant: SCHOTT AG, Mainz (DE)

(72) Inventors: Armin Vogl, Jena (DE); Thomas Schmiady, Jena (DE); Thilo Zachau, Neuengoenna (DE); Michael Meister, Mainz (DE); Jochen Alkemper, Klein-Winternheim (DE); Christian Kunert, Wiesbaden (DE); Lutz Klippe, Wiesbaden (DE); Rüdiger Dietrich, Jena (DE)

(73) Assignee: SCHOTT AG, Mainz (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/851,998

(22) Filed: Apr. 17, 2020

(65) Prior Publication Data

US 2020/0238664 A1 Jul. 30, 2020

Related U.S. Application Data

(63) Continuation of application No. 16/450,692, filed on Jun. 24, 2019, and a continuation of application No.
(Continued)

(30) Foreign Application Priority Data

Oct. 20, 2017 (DE) ..................... 10 2017 124 625.8

(51) Int. Cl.
*C03C 3/083* (2006.01)
*C03B 17/06* (2006.01)
(Continued)

(52) U.S. Cl.
CPC ............... *B32B 3/263* (2013.01); *B32B 3/02* (2013.01); *B32B 3/26* (2013.01); *B32B 3/30* (2013.01);
(Continued)

(58) Field of Classification Search
None
See application file for complete search history.

(56) References Cited

U.S. PATENT DOCUMENTS 3,843,344 A 10/1974 Galey
3,850,787 A 11/1974 Robinson
(Continued)

FOREIGN PATENT DOCUMENTS

AU 473784 3/1974
CN 1525945 9/2004
(Continued)

OTHER PUBLICATIONS

International Search Report dated Sep. 7, 2018 for corresponding International Application PCT/EP2018/066662.
(Continued)

*Primary Examiner* — Lisa L Herring
(74) *Attorney, Agent, or Firm* — Ruggiero McAllister & McMahon LLC

(57) ABSTRACT

Thin glass substrates are provided. Also provided are methods and apparatuses for the production thereof and provides a thin glass substrate of improved optical quality. The method includes, after the melting and before a hot forming process, adjusting the viscosity of the glass that is to be formed or has at least partially been formed is in a defined manner for the thin glass substrate to be obtained. The apparatus includes a device for melting, a device for hot forming, and also a device for defined adjustment of the viscosity of the glass to be formed into a thin glass substrate,
(Continued)

and the device for defined adjustment of the viscosity of the glass to be formed into a thin glass substrate is arranged upstream of the device for hot forming.

12 Claims, 11 Drawing Sheets

Related U.S. Application Data

PCT/EP2018/066662, filed on Jun. 21, 2018, said application No. 16/450,692 is a continuation of application No. PCT/EP2017/083554, filed on Dec. 19, 2017.

(51) Int. Cl.

| | |
|---|---|
| *C03B 18/02* | (2006.01) |
| *C03C 3/087* | (2006.01) |
| *C03C 3/093* | (2006.01) |
| *B32B 3/26* | (2006.01) |
| *B32B 17/10* | (2006.01) |
| *B32B 3/30* | (2006.01) |
| *B32B 3/02* | (2006.01) |
| *C03C 21/00* | (2006.01) |
| *C03B 23/023* | (2006.01) |

(52) U.S. Cl.
CPC .. *B32B 17/10036* (2013.01); *B32B 17/10045* (2013.01); *B32B 17/10119* (2013.01); *B32B 17/10137* (2013.01); *C03B 17/064* (2013.01); *C03B 18/02* (2013.01); *C03B 23/023* (2013.01); *C03C 3/083* (2013.01); *C03C 3/087* (2013.01); *C03C 3/093* (2013.01); *C03C 21/002* (2013.01); *B32B 2315/08* (2013.01); *B32B 2329/04* (2013.01); *B32B 2329/06* (2013.01); *B32B 2551/00* (2013.01); *B32B 2571/00* (2013.01); *B32B 2605/006* (2013.01); *Y10T 428/24777* (2015.01)

(56) References Cited

U.S. PATENT DOCUMENTS

| | | | |
|---|---|---|---|
| 3,961,930 A | 6/1976 | Robinson | |
| 4,138,239 A | 2/1979 | Nier | |
| 4,197,107 A * | 4/1980 | Kunkle | C03B 18/04 |
| | | | 65/182.1 |
| 5,876,472 A * | 3/1999 | Gros | C03C 3/091 |
| | | | 501/11 |
| 2005/0000248 A1 | 1/2005 | Lauten-Schlaeger | |
| 2005/0101469 A1 | 5/2005 | Peuchert | |
| 2006/0110603 A1 | 5/2006 | Langsdorf | |
| 2007/0243992 A1 | 10/2007 | Fechner | |
| 2011/0001902 A1* | 1/2011 | Ikadai | C03B 18/06 |
| | | | 349/91 |
| 2012/0094084 A1 | 4/2012 | Fisher | |
| 2013/0189486 A1 | 7/2013 | Wang | |
| 2014/0120335 A1* | 5/2014 | Yamanaka | C03C 3/087 |
| | | | 428/220 |
| 2014/0305502 A1* | 10/2014 | Sasai | C03C 3/087 |
| | | | 136/256 |
| 2015/0140301 A1 | 5/2015 | Fisher | |
| 2015/0251377 A1 | 9/2015 | Cleary | |
| 2015/0314571 A1 | 11/2015 | Cites | |
| 2016/0068423 A1* | 3/2016 | Tanaka | C03C 3/087 |
| | | | 428/156 |
| 2016/0176746 A1 | 6/2016 | Hunzinger | |
| 2016/0194242 A1* | 7/2016 | Tanaka | C03B 18/14 |
| | | | 428/141 |
| 2016/0257094 A1 | 9/2016 | Lestringant | |
| 2016/0279904 A1 | 9/2016 | Sienerth | |
| 2017/0052311 A1 | 2/2017 | Lautenschlaeger | |
| 2017/0113520 A1 | 4/2017 | Sienerth | |
| 2017/0334759 A1 | 11/2017 | Yamato | |
| 2018/0151408 A1 | 5/2018 | Hanawa | |
| 2018/0339929 A1 | 11/2018 | Katayama | |
| 2019/0308394 A1 | 10/2019 | Alkemper | |
| 2019/0352209 A1* | 11/2019 | Iga | C03B 25/093 |

FOREIGN PATENT DOCUMENTS

| | | | |
|---|---|---|---|
| CN | 1827543 | 9/2006 | |
| CN | 102219356 | 10/2011 | |
| CN | 104692627 | 6/2015 | |
| CN | 105621863 | 6/2016 | |
| DE | 1919819 | 11/1969 | |
| DE | 1555014 | 6/1970 | |
| DE | 2244038 | 4/1973 | |
| DE | 2309445 | 10/1974 | |
| DE | 102006051637 | 5/2008 | |
| DE | 102013203624 | 9/2014 | |
| EP | 3144141 | 3/2017 | |
| GB | 1143468 | 2/1969 | |
| GB | 1253284 | 11/1971 | |
| JP | H0710569 | 1/1995 | |
| JP | H0753223 | 2/1995 | |
| JP | 2004131314 | 4/2004 | |
| JP | 2005510440 | 4/2005 | |
| JP | 2013520385 | 6/2013 | |
| JP | 2015098424 | 5/2015 | |
| JP | 2015105216 | 6/2015 | |
| JP | 2016008161 | 1/2016 | |
| JP | 2016153344 | 8/2016 | |
| JP | 2016523788 | 8/2016 | |
| JP | 2016183054 | 10/2016 | |
| JP | 2016216323 | 12/2016 | |
| JP | 2017052687 | 3/2017 | |
| JP | 2020514219 | 5/2020 | |
| KR | 20150063947 | 6/2015 | |
| KR | 20160021762 A * | 2/2016 | ............. C03B 18/16 |
| WO | 2012051038 | 4/2012 | |
| WO | WO-2013145922 A1 * | 10/2013 | ........... C04B 35/106 |
| WO | WO-2013183449 A1 * | 12/2013 | ............. C03B 18/02 |
| WO | 2014052229 | 4/2014 | |
| WO | WO-2014185127 A1 * | 11/2014 | ............. C03B 18/06 |
| WO | 2014209861 | 12/2014 | |
| WO | 2015006201 | 1/2015 | |
| WO | 2015058885 | 4/2015 | |
| WO | 2015059407 | 4/2015 | |
| WO | 2015084902 | 6/2015 | |
| WO | 2015158464 | 10/2015 | |
| WO | 2015168259 | 11/2015 | |
| WO | 2016007812 | 1/2016 | |
| WO | 2016048815 | 3/2016 | |
| WO | 2016117650 | 7/2016 | |
| WO | WO-2016136348 A1 * | 9/2016 | ......... H01L 23/3107 |
| WO | 2016196546 | 12/2016 | |
| WO | 2017183381 | 10/2017 | |

OTHER PUBLICATIONS

DIN EN 1288-5, "Determination of the bending strength of glass—Part 5: Coaxial double ring test on flat specimens with small test surface areas", Sep. 2000.

DIN 52305, "Determining the optical distortion and refractive power of safety glazing material for road vehicles", Jun. 1995.

JIS B 0601:2013 (ISO 4287 : 1997, Amd. 1 : 2009) (JSA) "Geometrical Product Specifications (GPS)—Surface texture: Profile method—Terms, definitions and surface texture parameters", Mar. 21, 2013, 32 Pages.

JIS B 0651:2001 (ISO 3274 : 1996), (JSA) "Geometrical Product Specifications (GPS)—Surface texture: Profile method—Nominal characteristics of contact (stylus) instruments", Jan. 20, 2001, 4 Pages.

* cited by examiner

THIN GLASS SUBSTRATE, IN PARTICULAR A BOROSILICATE GLASS THIN GLASS SUBSTRATE, METHOD AND APPARATUS FOR ITS PRODUCTION

CROSS REFERENCE TO RELATED APPLICATIONS

This application is a continuation of International Application PCT/EP2018/066662 filed Jun. 21, 2018, which claims the benefit of German Application 10 2017 124 625.8 filed Oct. 20, 2017. This application is also a continuation of U.S. application Ser. No. 16/450,692 filed Jun. 24, 2019, which is a continuation of International Application PCT/EP2017/083554 filed on Dec. 12, 2017, which claims the benefit of German Application 10 2017 124 625.8 filed Oct. 20, 2017. The entire contents of all of which are incorporated by reference herein in their entirety.

BACKGROUND

1. Field of the Invention

The invention relates to a thin glass substrate, in particular a borosilicate glass thin glass substrate, to a method and to an apparatus for its production. Furthermore, measurement methods are specified for determining the optical quality, in particular of thin glass substrates produced according to the method.

2. Description of Related Art

Thin glass substrates are of increasing importance, inter alia in automotive engineering, since they not only allow to reduce the weight of a motor vehicle, but can also have a significant impact on the optical properties of the glazing thereof.

With increasing demands on the optical properties of such substrates, for example in conjunction with the display of two-dimensional information in rear projection or in conjunction with the sensing of optical data from the environment of the motor vehicle, there is an increasing demand arising for optically high-quality thin glass substrates and respective advances to reduce the weight thereof. Weight reduction of vehicle glazing is of great importance in particular in EV mobility, i.e. for electrically powered vehicles.

Document DE 23 09 445 A1 relates to a method for producing thin float glass of less than 2.5 mm thickness, in which molten glass is poured onto a metal bath in free fall, where it freely spreads to form a layer of uniform thickness in the viscosity range of up to $10^{5.25}$ poise, without intervention of lateral guide rollers, whereupon the glass ribbon is held in a deformable state in the following section of the float bath and is stretched in the longitudinal direction by increasing its speed, and in this deformation section forces are exerted on the glass ribbon by rollers exclusively acting on the edge regions of the glass ribbon from above so as to continuously control the stretching effect of the tensile force in order to cause gradual stretching to a predetermined thickness.

Document JP 7-53223 A discloses cooling means referred to as overhead coolers for improving the optical quality, in particular for reducing an optical property that is known as microcorrugation, after the principle forming process, following the use of the top roller drawing means. However, the reduction in microcorrugation has only a minor effect on the visual conspicuousness of drawing streaks.

Furthermore, it is also possible to remove heat directly upon entry into a hot forming system, but according to prior art only to a small extent.

International application document WO 2016048815 A1 describes devices capable of influencing the local temperature of a glass ribbon during hot forming thereof.

Document U.S. Pat. No. 3,843,344 A shows a cross-sectional view of a float system. It is disclosed that in the vicinity of a tweel or throughput control device shown in this cross-sectional view, glass must be allowed to flow freely, and that the temperature has to be high enough and viscosity low enough so that the glass does not absorb any stress, hence no tensile or shear stress, and rather should be enabled to relief such stress while flowing. More precisely, this document specifies that $\log_{10}$ viscosities should be lower than 3.0 at this point.

Application document U.S. Pat. No. 3,961,930 A teaches that an at least partially shaped glass is heated before it is further shaped.

Document AU 4631972 A describes that glass is passed through a throughput control component prior to floating, in particular through an aperture with a control gate, where it is then heated to temperatures of approximately 1250° C. to 1300° C. and thereby assumes a viscosity of approximately $10^3$ poise.

International application document WO 2016007812 A1 discloses feedback loops for adjusting several process parameters such as the viscosity of the glass ribbon on the float bath, but without giving specific values in each case.

International application document WO 2011/103801 A1 describes a pane assembly for high-speed trains, wherein a glass of this assembly may contain a boron oxide and in particular a borosilicate glass.

SUMMARY

The invention is based on the object to provide a thin glass substrate, in particular a borosilicate glass thin glass substrate of improved optical quality, as well as a method and an apparatus for its production. Furthermore, the invention also relates to advantageous uses of thin glass substrates, in particular borosilicate glass thin glass substrates of improved optical quality. In addition, an advantageous method for determining the optical quality is provided.

This object is achieved by the respective methods and apparatuses described in the independent claims. Advantageous embodiments are specified in the respective dependent claims and the description.

Surprisingly, the inventors have found that such drawing streaks can be mitigated with a method for producing a thin glass substrate, preferably for continuously producing a thin glass substrate, in particular a thin glass substrate with reduced drawing streaks, in which after the melting and prior to a hot forming process, the viscosity of the glass that is to be formed or has at least partially been formed is adjusted in a defined manner for the thin glass substrate to be obtained, and in which the viscosity of the glass to be hot formed is adjusted in a defined manner, in particular adjusted by defined cooling, prior to being delivered to a device for hot forming. All data about viscosity, in particular numerical data, will be given in lg η/dPa·s below, although this is not always stated explicitly, for the sake of brevity and as is customary in this technical field.

Here, mitigation of drawing streaks is understood to mean that a reduction of the size of the drawing streaks occurs, i.e.

of the volume of the elevations defined by the drawing streaks compared to an ideally plane substrate, in particular a thin glass substrate. For comparing the mitigation, a method is used in which the viscosity of the glass to be hot formed was 3.47 lg η/dPa·s upstream of the lip stone or spout, for example, which will be set out in more detail in the detailed description below based on particular measurement results. For the following comparative measurements, glasses were used with a composition as will be specified in more detail below in conjunction with the description of the measurements made on the thin glass substrate, for both the glasses according to the invention and the prior art comparative glasses.

Furthermore, generally, a thin glass substrate is considered to be a thin glass substrate with reduced drawing streaks, if elevations on one of the main surfaces of the thin glass substrate, in particular elongated elevations substantially rising in normal direction and having a longitudinal extent that is greater than two times, preferably three times, more preferably five times a transverse extent of the elevation, have a mean height which is less than 100 nm, preferably less than 90 nm, more preferably less than 80 nm, and in the case of a borosilicate glass thin glass substrate less than 85 nm, preferably less than 75 nm, and most preferably less than 65 nm, adjusted for wedge-shaped thickness variations and warpage, and with arithmetic averaging of an analysis surface area of $10*10$ cm$^2$, preferably in the center of a hot-formed glass ribbon perpendicular to the drawing direction, and with a transverse extent of the elevation smaller than 40 mm in each case.

Thin is defined by the float glass manufacturing process, in particular also for borosilicate glass. During floating, when the hot glass, in particular also borosilicate glass, flows out onto liquid tin, an equilibrium thickness of approximately 7 mm is established. A thin borosilicate glass in the sense of this invention is stretched in length and width after the hot glass, in particular the borosilicate glass has flowed out, such that a glass thickness of less than or equal to 5 mm is established. Previous mathematical models suggested that higher processing temperatures would also provide higher optical quality, so, initially, the increased viscosity associated with a reduction in temperature did not appear to be a promising measure for achieving improved optical quality.

In particular in the continuous production of thin glass substrates, care has been taken so far to make the distance between the melting tank dispensing the glass to be hot formed and the float bath containing a liquid metal as short as possible in terms of spatial extension and directly successively in terms of procedure. Furthermore, higher viscosities of the glass to be melted which are associated with low temperatures are rather unfavorable for melting tanks, since homogenization of the glass may become more difficult with increasing viscosity. Furthermore, cooling of the glass to be hot formed normally precludes a high throughput, since the then more viscously flowing glass has the tendency to reduce the flow rate within the hot forming process chain. For this reason, it has hitherto been considered to be particularly disadvantageous to intervene in the process chain of hot forming to reduce the temperature, in particular if this occurred at an early point in time and thus affected the entire process chain.

In a preferred method for producing a thin glass substrate, the viscosity is adjusted upstream of the lip stone for discharging the liquid glass, known as spout, in particular before being delivered onto a metal bath. In the context of the present disclosure, the terms lip stone and spout will be used synonymously and in each case denote the same component known to a person skilled in the art.

What is surprising is the procedural intervention according to the invention upstream of the spout or lip stone, since prior art float systems are normally not designed to permit interventions upstream of the spout or lip stone.

In the context of the present disclosure, the terms "upstream" and "downstream" are meant spatially. So, the term "upstream" refers to a location spatially located in front of another item as seen in the flow or drawing direction of the glass, and the term "downstream" or "behind" refers to a location spatially located behind or downstream of another item as seen in the flow or drawing direction of the glass. However, since in the present invention the glass is moved continuously or moves continuously, this may, in particular for the implementation of the method, also imply a corresponding time sequence for the respective process steps, especially also within an industrial process chain.

In a preferred method for producing a thin glass substrate, the viscosity is adjusted upstream of the control gate which is the component for flow rate control of the glass stream and is also referred to as a tweel, in particular before being delivered onto a metal bath, i.e. before being delivered onto the liquid metal of the float bath.

In the context of the present disclosure, adjusted in a defined manner means an adjustment of the viscosity so that it is adjusted within defined limits. This means, in particular, that after this adjustment the glass has the adjusted viscosity η of the glass, with a deviation from the defined setting of the viscosity of less than $\Delta$ lg η/dPa·s=0.3 at a distance of 12 m from a location immediately downstream of the throughput control component, i.e. at a distance of 12 m from a location immediately downstream of the tweel, $\Delta$ lg η/dPa·s=0.2 at a distance of 1.5 m from the location immediately downstream of the throughput control component, i.e. at a distance of 1.5 m from a location immediately downstream of the tweel, $\Delta$ lg η/dPa·s=0.1 immediately upstream of the throughput control component, i.e. immediately upstream of the tweel.

In a preferred method for producing a thin glass substrate, the viscosity of the glass that is to be formed or has at least partially been formed is preferably at least lg η/dPa·s=3.75 to preferably at most 4.5 at the end of a melting tank channel and upstream of the throughput control component or tweel, in particular immediately upstream of the throughput control component or tweel, and is lg η/dPa·s=3.75 to preferably at most 4.5 immediately downstream of the throughput control component or tweel, and/or is preferably at least lg η/dPa·s=5.25 to preferably at most 5.85 at the upstream end of trough section 1 or bay 1 and/or at a distance of 1.5 m downstream of the throughput control component or tweel in the drawing direction, and/or is at least lg η/dPa·s=7.05 to preferably at most 7.6 at the upstream end of trough section 4 or bay 4, that is at a distance of 12 m downstream of the throughput control component or tweel in the drawing direction.

In a particularly preferred embodiment, the following equation applies for the viscosity $\eta_1$ for a first stretch over a distance of up to 1.5 m downstream of the throughput control component or tweel, wherein $y_1$ indicates the distance to the location immediately downstream of the throughput control component or tweel and thus has the value of zero immediately downstream of the throughput control component or tweel:

$$lg\eta_1(y_1)/dPa\cdot s=(lg\eta_{01}/dPa\cdot s+a_1(y_1))$$

with $0 \text{ m} \leq y_1 \leq 1.5 \text{ m}$
$3.75 \leq lg\ \eta_{01}/dPa\cdot s \leq 4.5$
$a_1(y_1)=1.00/m*y_1$.

This equation is not necessarily meant to define a linear dependence for $lg\ \eta_1(y_1)/dPa\cdot s$ on the value y, although this is mostly true in large parts, but also to indicate the range of values for $lg\ \eta_1(y_1)$ at a fixed location $y_1$, when $lg\ \eta_{01}$ is varied in the above interval.

In preferred embodiments of the invention, the change in viscosity within the range of $0 \text{ m} \leq y_1 \leq 1.5 \text{ m}$ had a most preferred value per unit length of one meter of $\Delta\ lg\ \eta/dPa\cdot s/\Delta\ y=0.666/m\pm 0.1/m$, but was greater than 0.334/m and less than 0.8/m, and in this equation the term $\Delta\ lg\ \eta/dPa\cdot s$ does not indicate a deviation of the viscosity with respect to the actually desired value, but the variation of viscosity over the distance range $\Delta\ y$.

In a further preferred embodiment, the following equation applies for the viscosity $z_2$ for a second stretch from a distance of 12 m downstream of the throughput control component or tweel up to a distance of 16 m downstream of the throughput control component or tweel, wherein $y_2$ indicates the distance to the location immediately downstream of the throughput control component or tweel:

$$lg\eta_2(y_2)/dPa\cdot s=(lg\eta_{02}/dPa\cdot s+a_2(y_2))$$

with $12 \text{ m} \leq y_2 \leq 16 \text{ m}$
$7.05 \leq lg\ \eta_{02}/dPa\cdot s \leq 7.6$
$a_2(y_2)=0.788/m*(y_2-12 \text{ m})$.

This equation is not necessarily meant to define a linear dependence for $lg\ \eta_2(y_2)/dPa\cdot s$ on the value y, although this is mostly true in large parts, but also to indicate the range of values for $lg\ \eta_2(y_2)$ at a fixed location $y_2$, when $lg\ \eta_{02}$ is varied in the above interval.

Here and throughout the present disclosure, the mentioning of a distance "downstream of the tweel" or "behind the tweel", describes the distance in Y-direction from a location immediately located behind the tweel 17 or at the rear end of the tweel 17 as seen in the flow direction to the respective location to which this distance is indicated, even if not explicitly indicated in each case.

Here and throughout the present disclosure, the specification of a distance from or of a distance "behind the throughput control component" or "downstream of the throughput control component" describes the distance in Y-direction from a location immediately downstream of the throughput control component 17 or on the downstream end of the throughput control component 17, as seen in the flow direction, to the location up to which this stretch or corresponding distance is respectively indicated, even if not explicitly specified in each case.

This distance in the Y-direction is indicated as a value in meters in FIG. 3, by way of example. As in the present case, the upstream end of the float bath may constructively coincide with the end of the throughput control component or tweel, in particular with the rear end thereof in the flow or drawing direction.

In the preferred method for producing a thin glass substrate, the temperature of the glass for which the subsequent measurements of the first and second series of measurements of the drawing streaks or elongated elevations on the surface and the thickness thereof will be described for the glass that is to be formed or has at least partially been formed, is preferably at least 1100° C. and at most 1180° C. at the end of the melting tank channel and upstream of the throughput control component or tweel, in particular immediately upstream of the throughput control component, and/or is at least 850° C. and at most 910° C. at the upstream end of trough section 1 or bay 1 and/or at a distance of 1.5 m in the drawing direction, and/or is at least 720° C. and at most 760° C. at the upstream end of trough section 4 or bay 4 and/or at a distance of 12 m downstream of the throughput control component or tweel in the drawing direction.

In the preferred method for producing a thin glass substrate, the temperature of the borosilicate glass for which the subsequent measurements of the third and fourth series of measurements of the drawing streaks or elongated elevations on the surface and the thickness thereof will be described for the glass that is to be formed or has at least partially been formed, is preferably at least 1180° C. and at most 1330° C. at the end of the melting tank channel and upstream of the throughput control component or tweel, in particular immediately upstream of the throughput control component, and/or is at least 1000° C. and at most 1080° C. at the upstream end of trough section 1 or bay 1 and/or at a distance of 1.5 m in the drawing direction, and/or is at least 830° C. and at most 880° C. at the upstream end of trough section 4 or bay 4 and/or at a distance of 12 m downstream of the throughput control component or tweel in the drawing direction.

A maximum temperature deviation was at most 10° C. here in each case. For the purposes of the present disclosure, a defined adjustment of the temperature comprises an adjustment of the temperature of the glass to be hot formed within the maximum temperature deviations specified above, prior to or during the hot forming thereof. For the purposes of the present disclosure, a defined cooling of the glass comprises a lowering of the temperature of the glass to be hot formed so that the indicated temperatures are likewise within the maximum temperature deviations specified above, prior to or during the hot forming thereof.

A person skilled in the art will know how to control temperatures of tin baths, and also how to adjust the temperature in different trough sections or bays of tin baths.

The method for producing a thin glass substrate preferable uses a drawing process for hot forming, in particular a float process, a down-draw process, and/or a fusion process, in particular an overflow fusion down-draw process.

For hot forming the thin glass substrate, the method for producing a thin glass substrate, may advantageously comprise using an Li—Al—Si glass, an Al—Si glass, a borosilicate glass, in particular a borosilicate glass comprising the following constituents (in wt %):

| | |
|---|---|
| $SiO_2$ | 70-87 |
| $B_2O_3$ | 7-25 |
| $Na_2O + K_2O$ | 0.5-9 |
| $Al_2O_3$ | 0-7 |
| CaO | 0-3. |

In a method for producing a thin glass substrate, one embodiment for hot forming the thin glass substrate uses a borosilicate glass with the following composition, comprising:

| | |
|---|---|
| SiO$_2$ | 70-86 wt % |
| Al$_2$O$_3$ | 0-5 wt % |
| B$_2$O$_3$ | 9.0-25 wt % |
| Na$_2$O | 0.5-5.0 wt % |
| K$_2$O | 0-1.0 wt % |
| Li$_2$O | 0-1.0 wt %, | or a borosilicate glass, in particular an alkali borosilicate glass, containing:

| | |
|---|---|
| SiO$_2$ | 78.3-81.0 wt % |
| B$_2$O$_3$ | 9.0-13.0 wt % |
| Al$_2$O$_3$ | 3.5-5.3 wt % |
| Na$_2$O | 3.5-6.5 wt % |
| K$_2$O | 0.3-2.0 wt % |
| CaO | 0.0-2.0 wt %. |

In particular an Li—Al—Si glass may be used as well, in particular with a Li$_2$O content from 4.6 wt % to 5.4 wt % and an Na$_2$O content from 8.1 wt % to 9.7 wt % and an Al$_2$O$_3$ content from 16 wt % to 20 wt %.

In a particularly preferred method for producing a thin glass substrate, elevations form on one of the main surfaces of the thin glass substrate, in particular elongated elevations substantially rising in normal direction, which have a longitudinal extent that is greater than two times, preferably three times, more preferably five times a transverse extent of the elevation, and which have a height which, on average, is less than 100 nm, preferably less than 90 nm, more preferably less than 80 nm, and in the case of a borosilicate glass thin glass substrate less than 85 nm, preferably less than 75 nm, and most preferably less than 65 nm, adjusted for wedge-shaped thickness variations and warpage and with arithmetic averaging of an analysis surface area of 10*10 cm$^2$, preferably in the center of a hot-formed glass ribbon perpendicular to the drawing direction, and with a transverse extent of the elevation smaller than 40 mm in each case.

In one embodiment of the method for producing a thin glass substrate, a substantially wedge-shaped thickness variation K of the thin glass substrate as caused by the hot forming has a value of less than 100 µm, in the case of a borosilicate glass even a value of less than 40 µm, over a length of 1 m perpendicular to the drawing direction.

Furthermore, in one embodiment of the method for producing a thin glass substrate, a warpage of the thin glass substrate caused by the hot forming has a value of less than 600 µm, in the case of a borosilicate glass even a value of less than 300 µm, over a length of 1 m perpendicular to the drawing direction.

By the hot forming, the thin glass substrate may be obtained with an average thickness from 0.3 mm to 2.6 mm, preferably a thickness from 0.7 to 2.5 mm, most preferably a thickness of about 0.7 mm or a thickness of about 2.54 mm, averaged over a surface area of the first and second main surfaces of the thin glass substrate of at least 10 cm*10 cm.

According to a further embodiment, the glass substrate can be used in a thickness of up to 10 mm or even up to 12 mm with all the advantages of the invention, and a reduction in the height of the drawing streaks can be achieved.

In preferred embodiments of the method for producing a thin glass substrate, the fraction of quality glass amounts to more than 15% of the total glass throughput after the hot forming of the thin glass substrate at a throughput of less than 400 tons (t), preferably 200 t, and most preferably 100 t of hot formed thin glass per day.

The apparatus for producing a thin glass substrate according to the invention, in particular a thin glass substrate with reduced drawing streaks, in particular for carrying out a method as disclosed herein, comprises a device for melting, a device for hot forming, and a device for defined adjustment of the viscosity of the glass to be formed into a thin glass substrate, in which one and in particular the device for defined adjustment of the viscosity of the glass to be formed into a thin glass substrate is arranged upstream of the device for hot forming.

In particularly preferred embodiments, this device or a device for defined adjustment of the viscosity of the glass to be formed into a thin glass substrate is arranged upstream of the lip stone or spout.

In a preferred embodiment, one and in particular the device for defined adjustment of the viscosity of the glass to be formed into a thin glass substrate may also be arranged upstream of the throughput control component or tweel, in particular directly in front of the throughput control component or tweel.

Particularly preferably, the device for defined adjustment of the viscosity comprises cooling means.

In this case, the device for defined adjustment of the viscosity may comprise fluid flow areas, in particular areas through which water flows and which absorb heat from the glass to be hot formed.

This heat absorption can be achieved by direct heat conduction or by absorbing convection heat, by way of example.

In this apparatus, the viscosity of the glass specified here can advantageously be adjusted with a maximum deviation of $\Delta$ lg $\eta$/dPa·s=0.1 at a location immediately upstream of the throughput control component or tweel, $\Delta$ lg $\eta$/dPa·s=0.2 at a distance of 1.5 m downstream of the throughput control component or tweel, and $\Delta$ lg $\eta$/dPa·s=0.3 at a distance of 12 m downstream of the throughput control component or tweel.

Furthermore, in a preferred apparatus, a sensing unit is able to capture the temperature of the glass to be hot formed, in particular with a maximum deviation of 10° C., and/or to capture the viscosity of the glass to be hot formed, in particular with a maximum deviation of $\Delta$ lg $\eta$/dPa·s=0.1 immediately upstream of the throughput control component or tweel, $\Delta$ lg $\eta$/dPa·s=0.2 at 1.5 m downstream of the throughput control component or tweel, and $\Delta$ lg $\eta$/dPa·s=0.3 at 12 m downstream of the throughput control component or tweel.

In preferred embodiments, the device for hot forming may comprise a drawing system, a float system, in particular a down-draw system, in particular an overflow down-draw fusion drawing system.

A thin glass substrate according to a preferred embodiment has elevations on one of the main surfaces of the thin glass substrate, in particular elongated elevations substantially rising in normal direction, which have a longitudinal extent that is greater than two times, preferably three times, more preferably five times a transverse extent of the elevation, and which have a mean height that is less than 100 nm, preferably less than 90 nm, more preferably less than 80 nm, and for a borosilicate glass thin glass substrate less than 85 nm, preferably less than 75 nm and most preferably less than 65 nm, adjusted for wedge-shaped thickness variations and warpage and with arithmetic averaging of an analysis surface area of 10*10 cm², preferably in the center of a hot-formed glass ribbon perpendicular to the drawing direction, and with a transverse extent of the elevation smaller than 40 mm in each case. Alternatively, the aforementioned values may also be determined with measuring procedures other than those discussed herein, for example by mechanical scanning procedures on the thin glass substrate, and will yield the same measured values in this case. However, optical procedures can be used without contact, so that no changes in the surfaces will be caused, in particular no damage, such as for example due to scratching of the main surfaces at the locations of the measurement.

As a result of the hot forming of the thin glass substrate, the thin glass substrate may exhibit a substantially wedge-shaped thickness variation K with a value of less than 100 μm, in the case of borosilicate glass even less than 40 μm, over a length of 1 m perpendicular to the drawing direction, and/or a warpage V with a value of less than 600 μm, in the case of borosilicate glass even less than 300 μm, over a length of 1 m perpendicular to the drawing direction.

In preferred embodiments, the thin glass substrate may have a mean thickness of 0.5 mm to 2.6 mm, preferably a thickness of 0.7 to 2.5 mm, more preferably a thickness of about 0.7 mm or a thickness of about 2.54 mm, averaged over a surface area of the first and second main surfaces of the thin glass substrate of at least 10 cm*10 cm. Furthermore, it is also possible to produce glass substrates with a thickness of up to 10 mm or even 12 mm.

The thin glass substrate may comprise a borosilicate glass, and in this case it contains the following constituents (in wt %):

| | |
|---|---|
| $SiO_2$ | 70-87 |
| $B_2O_3$ | 7-25 |
| $Na_2O + K_2O$ | 0.5-9 |
| $Al_2O_3$ | 0-7 |
| CaO | 0-3. |

The thin glass substrate may also comprise a borosilicate glass with the following composition:

| | |
|---|---|
| $SiO_2$ | 70-86 wt % |
| $Al_2O_3$ | 0-5 wt % |
| $B_2O_3$ | 9.0-25 wt % |
| $Na_2O$ | 0.5-5.0 wt % |
| $K_2O$ | 0-1.0 wt % |
| $Li_2O$ | 0-1.0 wt %. |

In a further embodiment, the thin glass substrate comprises a borosilicate glass, in particular an alkali borosilicate glass, containing:

| | |
|---|---|
| $SiO_2$ | 78.3-81.0 wt % |
| $B_2O_3$ | 9.0-13.0 wt % |
| $Al_2O_3$ | 3.5-5.3 wt % |
| $Na_2O$ | 3.5-6.5 wt % |
| $K_2O$ | 0.3-2.0 wt % |
| CaO | 0.0-2.0 wt %. |

The thin glass substrate may comprise an Li—Al—Si glass, an Al—Si glass, a borosilicate glass, or a K—Na—Si glass.

Preferably, however, the thin glass substrate comprises an Li—Al—Si glass, in particular a lithium aluminum silicate glass having a $Li_2O$ content from 4.6 wt % to 5.4 wt % and an $Na_2O$ content from 8.1 wt % to 9.7 wt % and an $Al_2O_3$ content from 16 wt % to 20 wt %.

The thin glass substrate disclosed herein may form part of a motor vehicle glazing, in particular of a laminated glass pane.

Also, a windscreen projection device, in particular a head-up display for vehicles operated on land, on or in the water and in the air, in particular motor-driven vehicles, may advantageously comprise a thin glass substrate as disclosed herein, in particular as a back reflection surface.

Thus, the use of a thin glass substrate as a component of a laminated glass pane and in particular as a component of motor vehicle glazing is particularly advantageous.

Moreover, the inventors have found that not every optical defect of a thin glass substrate must lead to disturbances or a degradation in the optical properties thereof in the same manner.

Elevations on one of the main surfaces of a thin glass substrate, in particular elongated elevations extending on the float glass in a main direction, the drawing or advancement direction of the glass to be hot formed, and which are commonly referred to as drawing streaks, can lead to a marked degradation of the optical properties if they exceed a particular size, and may even have the effect of a cylindrical lens in the respective optical beam path. Such elevations or drawing streaks typically have a transverse extent of less than 40 mm.

For classifying such optical impairments, shadow casting procedures have been used, for example, which are described in DIN 52305, for example.

However, a drawback of these shadow casting procedures is that both faces of a glass substrate are captured in the transmission light operating mode that is normally employed, so that no information is obtained about the optical interaction of only one face. However, if these thin glass substrates are used for head-up displays employed in motor vehicles, for example, the optical quality of only one of the two main surfaces is of major importance, not transmission. If maximum deviation angles of an optical measuring beam are determined in a measurement in back reflection, this value is only of secondary importance as well, since in this case there will be insufficient information about the properties of a system formed with this measured main surface.

Consequently, there is also an interest in being able to identify the optical properties of a glass substrate, in particular a thin glass substrate, with higher significance. It would be advantageous in this case if such a method would lead to direct statements about the behavior within an optical system, for example to statements about lens-like optical powers of the entire measured field.

It would be particularly advantageous if the respective main surface of a glass substrate, in particular of a thin glass substrate, could be measured independently of the respective other main surface of this thin glass substrate.

BRIEF DESCRIPTION OF THE DRAWINGS

The invention will now be described in more detail by way of preferred and particularly preferred embodiments and with reference to the accompanying drawings, wherein.

DETAILED DESCRIPTION

Figure 1:
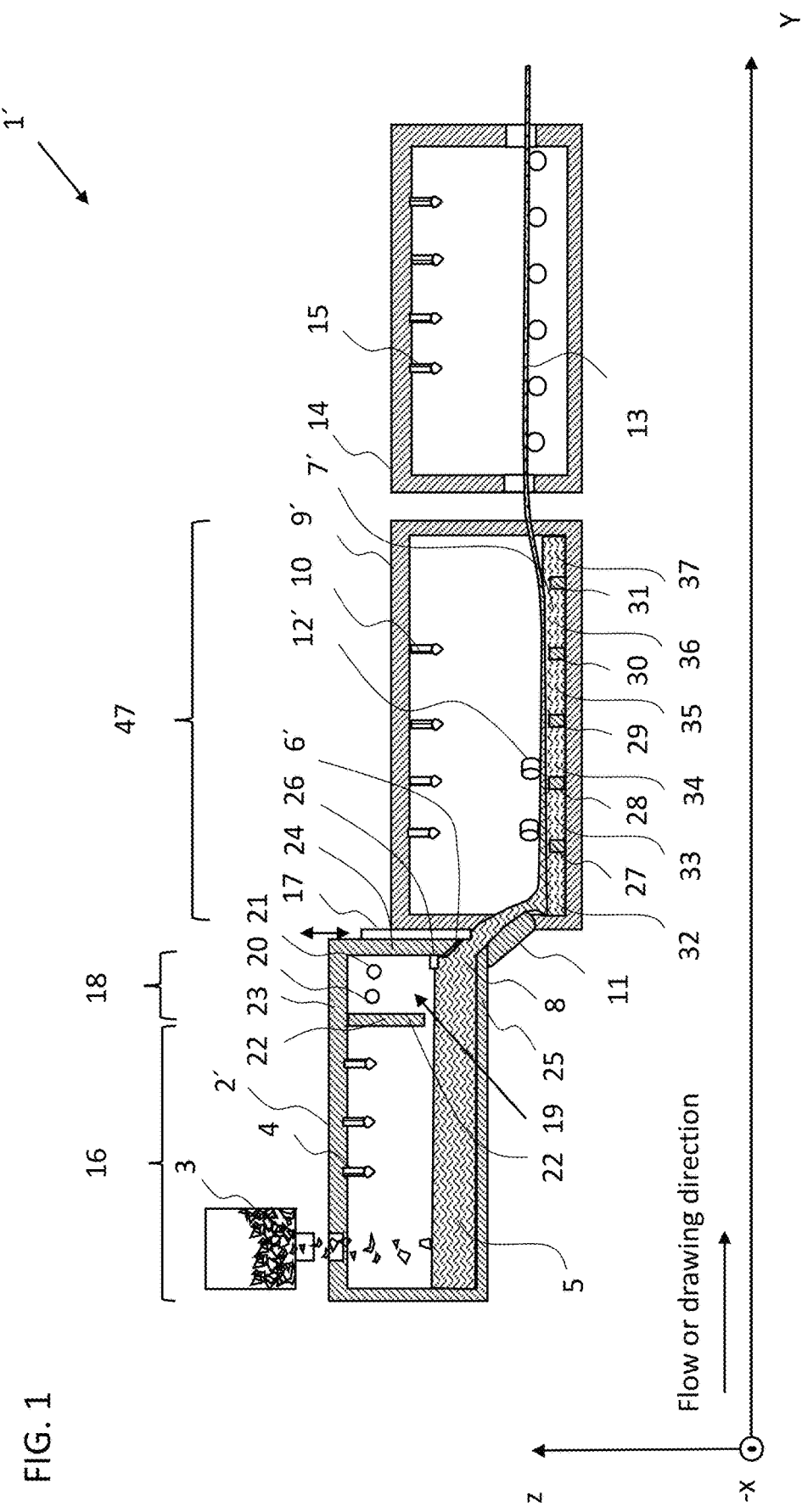
FIG. 1 is a schematic sectional view of an apparatus for producing a thin glass substrate according to a preferred embodiment of the invention, in which the sectional plane extends vertically approximately through the center of the device.

In the following description of preferred and particularly preferred embodiments, the same reference numerals in the various figures designate the same or equivalent components of the respective apparatus disclosed herein.

Figure 17:
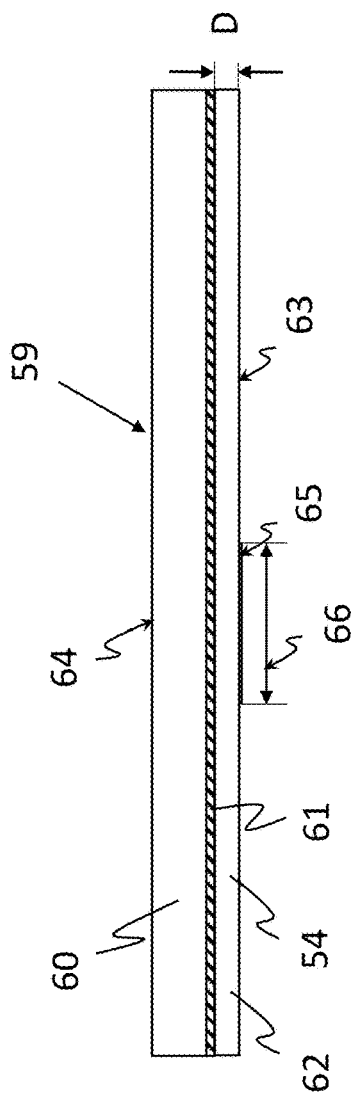
FIGS. 17 and 18 each show a schematic view of a laminated glass pane according to preferred embodiments of the invention, each having a reflection surface for a head-up display.

The data on the thickness D of the thin glass substrate correspond to the distance between the two main surfaces of the thin glass substrate, as can be seen in FIG. 17, and have to be measured perpendicular to these main surfaces in each case, as shown by the two arrows next to the reference character D in FIG. 17.

As already stated in the original priority application, the thin glass substrate, in particular the borosilicate glass thin glass substrate, may preferably be obtained by the hot forming in an average thickness from 0.3 mm up to 2.6 mm, preferably a thickness from 0.7 mm to 2.5 mm, most preferably a thickness of about 0.7 mm or a thickness of about 2.54 mm, arithmetically averaged over a surface area of at least 10 cm*10 cm of the first and second main surfaces of the thin glass substrate.

Figure 2:
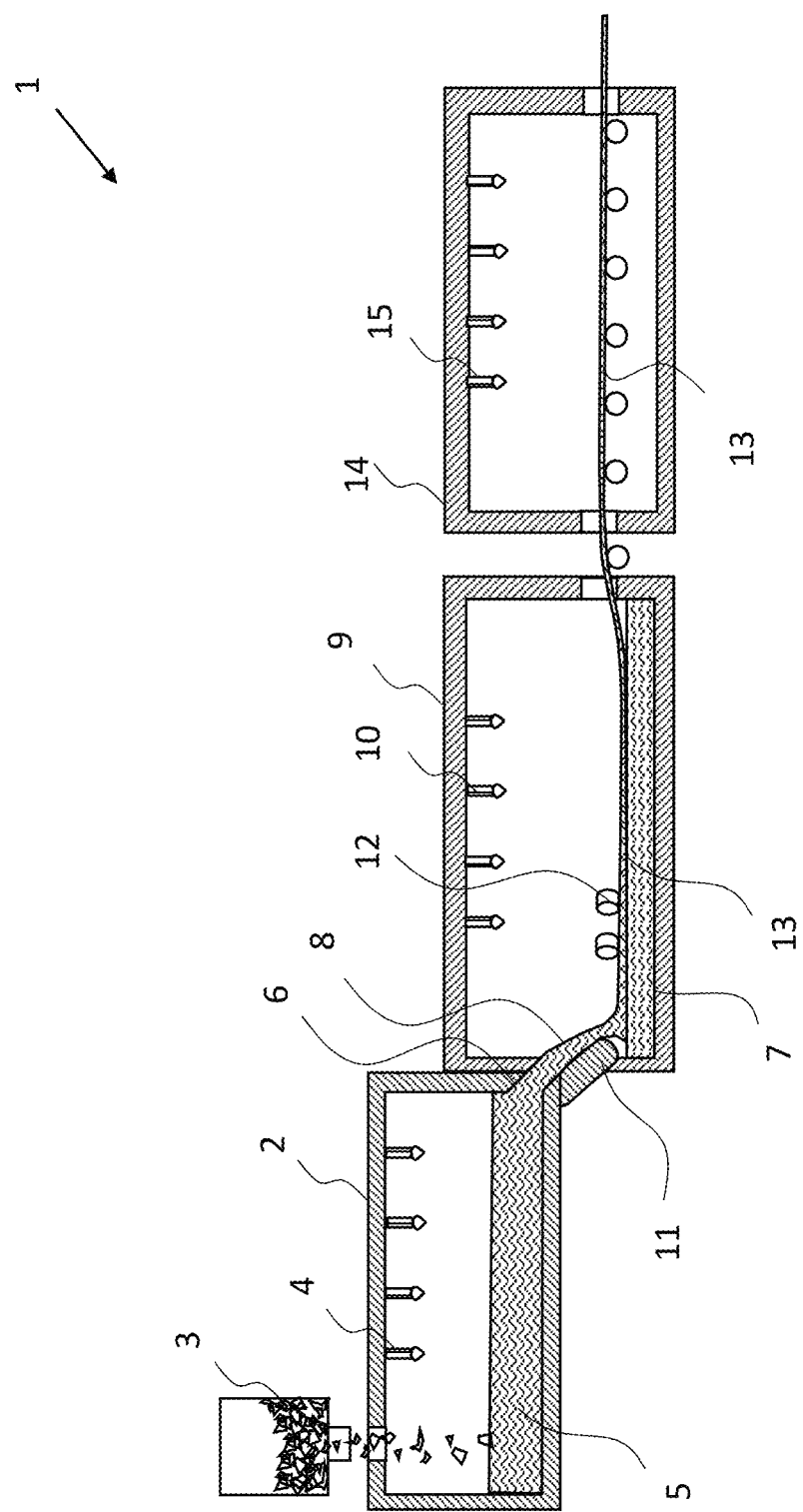
FIG. 2 is a schematic sectional view of an apparatus for producing a thin glass substrate of a prior art float system, in which the sectional plane extends vertically approximately through the center of the device.

Referring first to the prior art system for producing float glass as shown in FIG. 2, which is overall designated by reference numeral 1, similar to the apparatus according to the invention.

This float system comprises a melting furnace 2, also referred to as a melting tank, to which a glass batch 3 to be melted is fed in known manner and is heated by burners 4 until a glass melt 5 of the desired composition is obtained. Further devices for homogenization of the molten glass will be known to a person skilled in the art and are therefore not described in more detail.

Through a channel 6, the molten glass of glass melt 5 reaches a float bath 7, usually under the influence of gravity, which float bath comprises liquid tin on which the glass 8 to be hot formed can spread laterally, as part of the hot forming procedure thereof under the influence of gravity thereby reducing its height.

For adjusting the temperature of the glass to be hot formed, the tin bath 7 may be contained in a float bath furnace 9 which likewise has burners 10 that can be used to adjust the temperature of the glass to be hot formed.

When the molten glass 8 to be hot formed leaves the melting tank 2, it is directed onto the tin bath 7 via an inlet lip 11 which extends obliquely downwards and is also referred to as a lip stone or spout, and on which the glass already begins to spread. Roller-shaped top rollers 12 are used as drawing means to influence in a defined manner the glass ribbon 13 being formed on the tin bath 7 in its further movement from the lateral side, in its spreading movement. FIGS. 1 and 2 each show only two top rollers, by way of example, however, more than two of these top rollers may be provided and used, depending on requirements.

After having been hot formed, the glass ribbon 13 may optionally be transferred into an annealing lehr 14, which may also have burners 15 in order to subject the glass ribbon to a defined temperature decrease.

Once the glass ribbon 13 left the annealing lehr 14, it is then available for further processing, in particular for being cut into glass panes or glass substrates.

In order to be able to illustrate more clearly spatial relationships of particular assemblies or properties, such as of glasses to be hot formed or of thin glass substrates in the following description of embodiments of the invention, reference is first made to the Cartesian coordinate system shown in FIG. 3, which defines orthogonal X-, Y-, and Z-directions, to which all the information in the various figures will refer to.

The X- and Y-directions span a plane which extends horizontally and therefore substantially parallel to the surface of the tin bath 7. The Z-direction extends upwards, perpendicularly to this plane, and thereby defines the normal direction with respect to the glass ribbon 13.

Referring now to FIG. 1 which shows the float system designated by reference numeral 1' as a whole, as an apparatus for producing a thin glass substrate, in particular a thin glass substrate with reduced drawing streaks and which comprises all the devices described with reference to FIG. 2.

This includes the melting tank or melting furnace 2' as a device for melting 16, a feeding device for the glass batch 3, and the burners 4. Furthermore, the melting tank 2' has a channel 6' for transferring the molten glass 8 to be hot formed onto the tin bath 7'.

By way of example, the control gate 17 is located downstream of channel 6', i.e. the component for throughput control of the glass stream, also known as a tweel. By shifting the control gate or tweel 17, which is the component for throughput control 17, in the direction of the double arrow shown next to reference numeral 17, the cross section of the channel 6 can be narrowed or enlarged, thereby controlling and in particular adjusting in a defined manner the amount of molten glass 8 to be hot formed exiting the tank 2' per unit time. Furthermore, a feeder channel may be arranged between melting tank 2' and float bath furnace 9, in particular upstream of the tweel 17, which in this case defines the channel 6, in particular also over a longer distance than shown in FIG. 1. A more detailed description of flow rate control can be found in DE 10 2013 203 624 A1 of the present Applicant, which is incorporated into the subject matter of the present application by reference.

A device 18 for defined adjustment of the viscosity of the molten glass 8 to be hot formed is arranged upstream of the throughput control component 17 and upstream of the lip stone or spout 11, as seen in the flow direction of the molten glass 8 to be hot formed.

In preferred embodiments, the device 18 for defined adjustment of the viscosity may also be arranged immediately upstream of the lip stone or spout.

This device 18 for defined adjustment of the viscosity comprises a chamber 19 which is separated from the melting tank 2' or may else form part thereof, and which receives the molten glass 8 to be formed into a thin glass substrate for adjusting the viscosity thereof in a defined manner.

Furthermore, the device 18 for defined adjustment of the viscosity comprises fluid flow areas 20, 21, in particular areas through which water flows, which absorb heat from the glass 8 to be hot formed and which may be configured in the form of a metallic pipe system. This metallic pipe system may also be dyed for better heat absorption, or may be provided with a temperature-resistant paint on the surface thereof.

Alternatively or additionally, the walls 22, 23, 24, and 25 of the chamber 19 may absorb heat from the glass 8 to be hot formed, by setting their temperature in a defined manner, for example through further cooling means.

The chamber 19 with its walls 22, 23, 24, and 25 may else be provided spatially separated from the melting tank 2' and may have high temperature resistant metallic walls to provide improved heat dissipation, as will be described in more detail below with reference to FIG. 3.

If the device 18 for defined adjustment of the viscosity and thus the chamber 19 with its walls 22, 23, 24, and 25 is provided spatially separated from the melting tank 2' and consequently does not form part of the melting tank 2', all information on the viscosity and temperature which are preferably given for the end of the melting tank channel and upstream of the throughput control component or tweel will only refer to the location immediately upstream of the throughput control component or tweel and will not include the end of the melting tank channel which is then spatially separated from this location.

As described above, the device 18 for defined adjustment of the viscosity comprises at least one cooling means that can be used to adjust the temperature and therefore also the viscosity of the glass 8 to be hot formed in a defined manner. It allows to adjust the viscosity of the glass 8 with a maximum deviation of $\Delta \lg \eta/dPa \cdot s = 0.1$ at a location immediately upstream of the throughput control component or tweel, $\Delta \lg \eta/dPa \cdot s = 0.2$ at a distance of 1.5 m from a location immediately downstream of the throughput control component or tweel, and $\Delta \lg \eta/dPa \cdot s = 0.3$ at a distance of 12 m from the location immediately downstream of the throughput control component or tweel.

The device 18 for defined adjustment of the viscosity further comprises a sensing unit 26, which captures the temperature of the glass 8 to be hot formed, in particular with a maximum deviation of 10° C., and thus also acquires the viscosity of the glass to be hot formed, in particular with a maximum deviation of $\Delta \lg \eta/dPa \cdot s = 0.1$ at a location immediately upstream of the throughput control component or tweel, $\Delta \lg \eta/dPa \cdot s = 0.2$ at a distance of 1.5 m from the location immediately downstream of the throughput control component or tweel, and $\Delta \lg \eta/dPa \cdot s = 0.3$ at a distance of 12 m from the location immediately downstream of the throughput control component or tweel.

Viscosity measurements are well known to a person skilled in the art.

However, it is also possible to achieve a viscosity measurement or determination of the viscosity $\eta$ by measuring the temperature T of the respective glass at the respectively specified location and subsequently to convert the temperature T into viscosity values $\eta$.

In this case, the temperature-viscosity curve of the respective glass can be used for a conversion of the temperature values T into viscosity values $\eta$. This temperature-viscosity curve can be determined beforehand by measuring the viscosity $\eta$ for each temperature T to be measured in a conventional manner.

However, it is also possible for this purpose to use the Vogel-Fulcher-Tammann equation $\lg \eta = A + B/(T-T_o)$ for the respective glass, in this case with indication of the temperatures in ° C.

For this purpose, the corresponding coefficients $T_o$, A, and B for the respective glass can be determined experimentally first, and can then be used to determine the viscosity $\eta$. The value of the measured temperature T will then define the respective value of viscosity $\eta$ measured correspondingly and converted using this equation.

Non-contact temperature measurements and, alternatively or additionally, direct temperature measurements in contact with the glass to be measured are known to a person skilled in the art. In the context of the present disclosure, corresponding sensors are described with the sensing device or unit 26, for example.

The sensing device or unit 26 may be in direct contact with the glass and may thus perform a direct temperature measurement, or it may comprise a radiation measuring device which identifies the temperature by capturing the spectrum emitted by the glass 8 to be hot formed, based on the spectrum itself and/or the intensity of the emitted radiation. The sensing device 26 may be arranged at a location immediately upstream of the tweel 17 and in this case in direct proximity to the front end thereof as seen in the flow direction, or else at a small distance from the tweel 17, as can be seen in FIG. 1, by way of example. Instead of just one sensing unit 26, further sensing units may be arranged at further locations, in particular at further locations spaced apart in the flow direction. For example, a further sensing unit may also be located at the upstream end of trough section 1 or bay 1, that is at a distance of up to 1.5 m downstream of the throughput control component or tweel in the drawing direction, and also at the upstream end of trough section 4 or bay 4 and/or at a distance of up to 12 m downstream of the throughput control component or tweel in the drawing direction, although this was not illustrated again in FIG. 1, for the sake of clarity of the illustration.

The apparatus 1' for producing a thin glass substrate, in particular a thin glass substrate with reduced drawing streaks, comprises a device 47 for hot forming which will be described in more detail below with reference to FIG. 3 and which is located downstream of the device 18 for defined adjustment of the viscosity as seen in the flow or drawing direction and receives the glass 8 to be hot formed through the lip stone or spout 11.

The lip stone or spout 11 directs the glass 8 to be hot formed onto a tin bath 7' which is accommodated in the float bath furnace 9'. At the bottom of float bath furnace 9' there are crossbars 27 to 31 dividing the tin bath into a plurality of bays 32 to 37. Here, bay refers to a respective trough section defined by these crossbars. The upstream end of the first trough section 1 denoted by reference numeral 32, or bay 32, is directly downstream of the inlet lip 11 at a distance of 1.5 m from the throughput control component 17 or control gate 17, as seen in the flow or drawing direction. The upstream end of the respective further trough sections or bays 33 to 37 is defined by the respective next crossbar 27 to 31 in the flow direction in each case. The downstream end of each crossbar 27 to 31 defines the upstream end of the respective subsequent trough section 33 to 37, or bay 33 to 37 in each case. Thus the upstream end of trough section 4 or bay 4, i.e. the beginning of the fourth bay or fourth trough section in the flow direction is at a distance of 12 m from the throughput control component 17 or control gate. Float baths are usually subdivided into 7 or 8 bays, whereas FIG. 1 only shows six subsequent bays by way of example, i.e. bay 1 to bay 6, designated by reference numerals 32 to 37. For further description, reference is also made to DE 10 2006 051 637 A1 which discloses float baths with respective bays.

Figure 3:
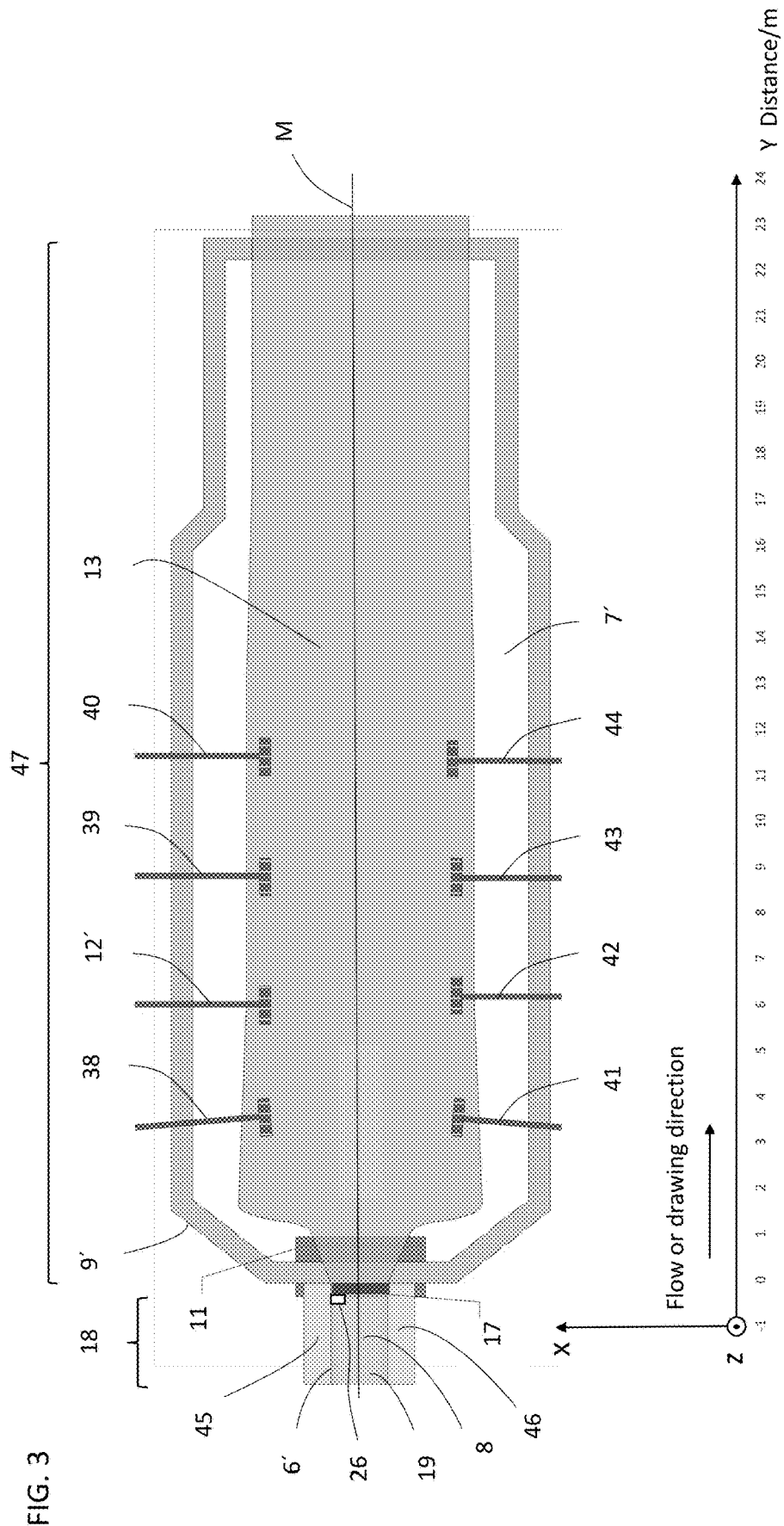
FIG. 3 is a schematic plan view of part of an apparatus for producing a thin glass substrate according to a preferred embodiment, in particular of a glass ribbon to be hot formed on a float bath.

As can also be clearly seen from FIG. 3, further top rollers 38 to 44 are arranged next to the top roller 12' above the glass ribbon 13 being formed on the tin bath 7', for mechanically moving the glass ribbon 13.

The distance from the end of throughput control component or tweel 17 to the upstream end of bay 1 designated by reference numeral 32 is 1.5 m in the drawing or flow direction, and the distance from the end of throughput control component or tweel 17 to the upstream end of bay 4 that is designated by reference numeral 35 is 12 m in the drawing or flow direction, as can also be seen from the Cartesian coordinate system of FIG. 3 which is scaled in the X-direction.

FIG. 3 furthermore shows an alternative or additional embodiment of the device 18 for defined adjustment of the viscosity. The molten glass 8 is located in a channel 6' extending from the melting tank 2' (not shown in FIG. 3) to the float bath furnace 9'. The walls 45, 46 of the channel 6' are formed of a high temperature resistant metal, such as platinum, which may also be provided on a mineral refractory material as a metallic layer. By defined adjustment of the temperature of the walls 45, 46, heat can be withdrawn from the glass 8 and the temperature and viscosity thereof can be adjusted in a defined manner as well. In this embodiment, again, the sensing unit 26 described above may preferably be disposed in the vicinity of the tweel 17.

Above, a drawing device was described for the device 47 for hot forming, comprising a float device, in particular a float bath furnace 9' with a tin bath 7'.

In a further embodiment, however, the invention may also comprise a down-draw drawing device, in particular an overflow down-draw fusion drawing device which is not shown in the figures, and the method may not only comprise a float process but also a down-draw process, in particular an overflow fusion down-draw process.

Figure 4:
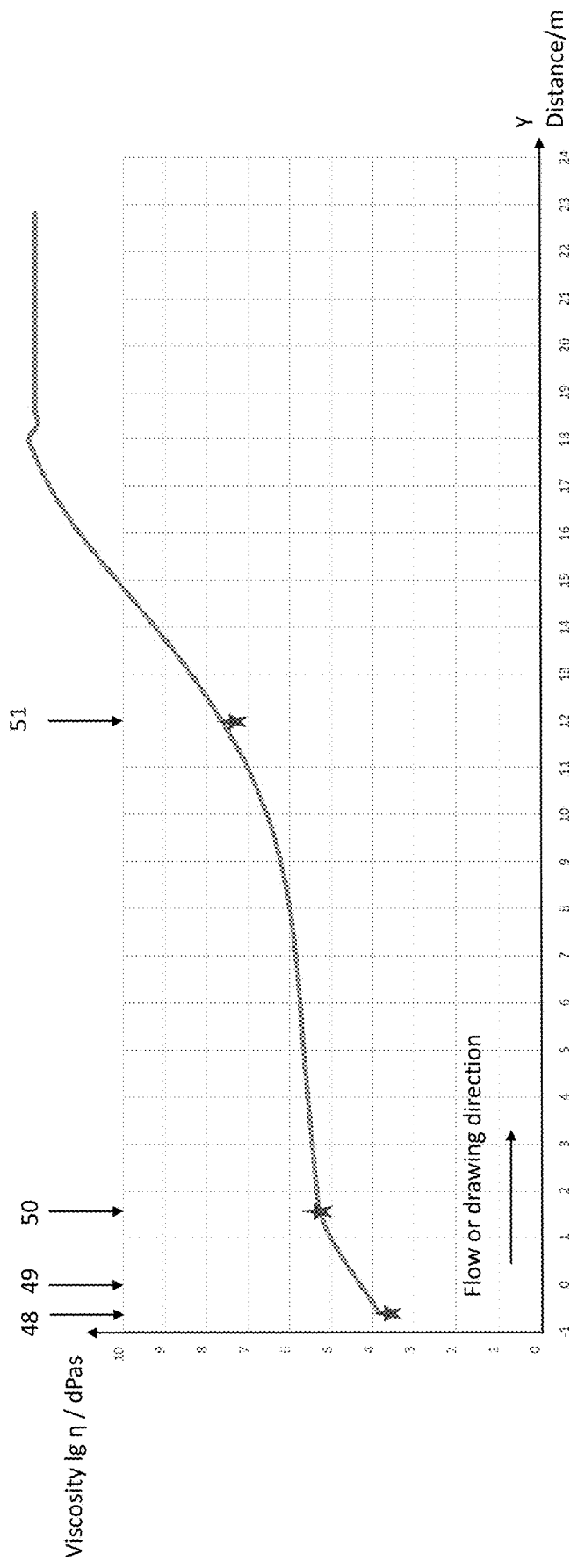
FIG. 4 shows a profile of viscosity of the glass on the float bath, in the flow or drawing direction which is indicated as the Y-direction of a Cartesian coordinate system.

Referring now to FIG. 4 which shows the profile of viscosity of the glass 8 or glass ribbon 13 provided on the float bath 7' in the flow or drawing direction along the center line M, which is also indicated as the Y-direction of the Cartesian coordinate system and here gives the respective viscosity $\eta$ of the glass 8 or glass ribbon 13 as a function of the location along the Y-direction.

In FIG. 4, an arrow 48 is indicated at a point in the Y-direction upstream of the throughput control component 17 or tweel 17 and upstream of the lip stone 11 or spout 11. In preferred embodiments, this location in Y-direction is immediately upstream of the throughput control component 17 or tweel 17, i.e. directly in front of its front end as seen in flow direction. Insofar as statements are made in the context of the present disclosure relating to "upstream of the throughput control component" or "upstream of the tweel", in particular with respect to viscosities or temperatures, these statements refer to this location in front of the throughput control component or to this location in front of the tweel in preferred embodiments. Insofar as statements are made in the context of the present disclosure relating to "upstream of the spout", in particular with respect to viscosities or temperatures, these statements in the preferred embodiments refer to a location immediately upstream of the spout in the flow direction.

Insofar as statements are made in the context of the present disclosure relating to "upstream of the lip stone", in particular with respect to viscosities or temperatures, these statements in the preferred embodiments refer to a location immediately upstream of the lip stone in the flow direction.

Arrow 49 is located at the point in Y-direction corresponding to the rear end of the throughput control component or tweel 17 in the flow or drawing direction and therefore also indicates the location immediately downstream of the throughput control component 17 or tweel 17, on which the distance indications disclosed herein are based. Arrow 50 is located at the point in Y-direction at a distance of 1.5 m from this rear end of the throughput control component or tweel 17 and thus at a location corresponding to the upstream end of bay 1 in the flow or drawing direction in a preferred embodiment. Arrow 51 is located at a distance of 12 m from the rear end of the throughput control component 17 or tweel in the Y-direction, corresponding to the upstream end of bay 4 in the flow or drawing direction in this preferred embodiment.

The apparatuses and devices described above can be used to perform a method according to the invention for producing a thin glass substrate, preferably for continuously producing a thin glass substrate, in particular a thin glass substrate with reduced drawing streaks.

This method comprises, after melting and prior to the hot forming, to adjust in a defined manner the viscosity η of the glass 8 to be formed, in particular hot formed or of glass 13 that has at least partially been formed, for the thin glass substrate to be obtained.

This defined adjustment of the viscosity η is performed prior to delivery to a device 47 for hot forming, in particular prior to delivery to a float bath furnace 9', and in particular comprises cooling of the glass 8 to be hot formed in a defined manner, using the device 18.

An adjustment of the viscosity η is performed upstream of the lip stone or inlet lip for the discharge of the liquid glass, known as spout 11, and is made in particular prior to the discharge onto a metal bath, the tin bath 7' of the float bath furnace 9'.

An adjustment of the viscosity may also be effected upstream of the control gate 17, i.e. the throughput control component 17 for the glass stream, known as tweel 17.

The viscosity of the glass to be formed is at least lg η/dPa·s=3.75 at the end of the channel of the melting tank 2', i.e. at the end of the channel 6' and upstream of the throughput control component or tweel 17, and/or is lg η/dPa·s=3.75 to preferably at most 4.5 immediately downstream of the throughput control component or tweel.

At the upstream end of bay 1 and/or at a distance of up to 1.5 m or of 1.5 m downstream of the throughput control component 17 or tweel 17 in the drawing direction, the viscosity may be between at least lg η/dPa·s=5.25 and preferably at most 5.85 in a preferred embodiment, and/or at the upstream end of bay 4 and/or at a distance of up to 12 m or of 12 m downstream of the throughput control component or tweel in the drawing direction, it may be between at least lg η/dPa·s=7.05 and preferably 7.6.

Here, for the glass for which the subsequent measurements of the drawing streaks or elongated elevations on the surface and the thickness thereof will be described, the temperature of the glass that is to be formed or has at least partially been formed may be at least 1180° C. and at most 1330° C. upstream of the throughput control component or tweel, and/or at least 1000° C. and at most 1080° C. at the upstream end of bay 1 and/or at a distance of 1.5 m in the drawing direction, and/or at least 830° C. and at most 880° C. at the upstream end of bay 4 and/or at a distance of about 12 m downstream of the throughput control component or tweel in the drawing direction. In each case, a maximum temperature deviation was at most 10° C.

In a particularly preferred embodiment, the following equation applies for the viscosity $\eta_1$ for a first stretch over a distance of up to 1.5 m downstream of the throughput control component or tweel, wherein $y_1$ indicates the distance to the location immediately downstream of the throughput control component 17 or tweel 17 and thus has the value of zero immediately downstream of the throughput control component or tweel:

$$lg\eta_1(y_1)/dPa\cdot s=(lg\eta_{01}/dPa\cdot s+a_1(y_1))$$

with 0 m≤y≤1.5 m
3.75≤lg $\eta_{01}$/dPa·s≤4.5
$a_1(y_1)=1.00/m*y_1$.

In this preferred embodiment of the invention, the change in viscosity within the range of 0 m≤$y_1$≤1.5 m had a most preferred value per unit length of one meter of Δ lg η/dPa·s/Δ y=0.666/m+0.1/m, but was greater than 0.334/m and less than 0.8/m, and in this equation Δ lg η/dPa·s indicates the variation of viscosity over the distance range Δ y.

Thus, for the location immediately downstream of the throughput control component, i.e. the tweel or control gate at $y_1$=0, the above inequation teaches the interval set forth below for the viscosity η($y_1$=0) of the glass that is to be formed or has at least partially been formed:

$$lg\eta(y_1=0)/dPa\cdot s=lg\eta_1(y_1=0)/dPa\cdot s=(lg\eta_{01}/dPa\cdot s+a_1(y_1=0))$$

However, as $a_1(y_1=0)$ assumes the value of zero at the location immediately downstream of the throughput control component or tweel which is preferably in the form of a control gate, the above inequation thereby gives:

$$lg\eta(y_1=0)/dPa\cdot s=lg\eta_1(y_1=0)/dPa\cdot s=lg\eta_{01}\eta/dPa\cdot s$$

at this location for the viscosity η($y_1$=0) of the glass that is to be formed or has at least partially been formed.

Thus, with the above statement 3.73≤lg $\eta_{01}$/dPa·s≤4.5, this interval is also true for lg η($y_1$=0) for the viscosity η($y_1$=0) at this location immediately downstream of the throughput control component in the form of a control gate:

$$3.75 \le lg\eta(y_1=0)/dPa\cdot s \le 4.5.$$

These values essentially result due to the fact that the glass, when passing through the throughput control component, in particular when passing through the control gate, does not experience any noticeable change in temperature within the measurement accuracy range and therefore no noticeable change in viscosity within the measurement accuracy range.

Thus, the glass that is to be formed or has at least partially been formed does not change its viscosity η, within the measurement accuracy range, when passing through the throughput control component, in particular when passing through the control gate.

As shown above, such intervals for the viscosity η can be given for each respective value of $y_1$ and of $y_2$.

In a further preferred embodiment, the following equation applies for the viscosity $f_2$ for a second stretch from a distance of 12 m downstream of the throughput control component or tweel up to a distance of 16 m downstream of the throughput control component or tweel, wherein $y_2$ indicates the distance to the location immediately downstream of the throughput control component or tweel:

$$lg\eta_2(y_2)/dPa\cdot s=(lg\eta_{02}/dPa\cdot s+a_2(y_2))$$

with 12 m≤$y_2$≤16 m
7.05 lg $\eta_{02}$/dPa·s≤7.6
7.06 $a_2(y_2)=0.788/m*(y_2-12$ m).

In the context of the present disclosure, all distance indications relating to viscosities and in particular to the viscosity η, $\eta_1$, $\eta_2$, or to the temperature of the glass are indicated starting from the location immediately downstream of the throughput control component, i.e. the tweel or control gate, and are indicated in the drawing or flow direction in each case, i.e. in the Y-direction. In embodiments with melting tanks that have a tweel, this location immediately behind or downstream of the throughput control component corresponds to the rear side of the tweel or control gate 17 as seen in the flow direction.

In a first embodiment, in which the device 18 for defined adjustment of the viscosity forms part of the melting tank, the end of the channel 6' of the melting tank 2' is located immediately upstream of the throughput control component 17 or tweel 17.

In the context of the present disclosure, the data given for the respective viscosities apply at least for the center of the glass 8 or glass ribbon 13, seen in the X and Z directions. A corresponding center line M extending along the center of the glass 8 or glass ribbon 13 in the X direction is shown in FIG. 3 by way of example.

The viscosities described above were achieved particularly well in systems for hot forming a thin glass substrate at a throughput of less than 400 t, preferably 200 t, more preferably 100 t of glass per day.

After the hot forming of the thin glass substrate at a throughput of less than 400 t per day, preferably 200 t per day, most preferably 100 t of glass per day, the fraction of quality glass per day was more than 15% of the total glass throughput. Here, quality glass is understood to mean a glass substrate in which the maximum height H of the elevations described herein, and thus the maximum height H of the drawing streaks is less than 100 nm, and the transverse extent of the elevation is smaller than 40 mm in each case, with arithmetic averaging of an analysis surface area of 10*10 cm$^2$ and adjusted for wedge-shaped thickness variations and warpage, preferably in the center of a hot-formed glass ribbon perpendicular to the drawing direction.

In the context of the present disclosure, measured values of thickness and height are considered to be adjusted for wedge-shaped thickness variations and warpage if the influence of the wedge-shaped thickness variation K and of warpage V is reduced to a value of less than 5%.

Generally, the molten glass, in particular the glass for which the measurements of the surface and thickness of the thin glass substrate are given below and which entered the device 18 for defined adjustment of the viscosity from the melting tank 2', was received in the device 18 at a first temperature of 1500° C., for example, or in the case of borosilicate glass even of 1650° C., for example, and was cooled to a second temperature of 1050° C., for example, or in the case of borosilicate glass to 1300° C., for example, for entering the hot forming process, and was then transferred into the device 47 for hot forming at this temperature.

However, the cooling was at least by 250° C., preferably by 300° C., more preferably by 450° C., in the case of borosilicate glass, however, most preferably by 350° C., and even cooling by 500° C. was possible with the device 18.

In the method according to the invention, in particular in the apparatus described herein, the following glasses may advantageously be used: Borosilicate glasses, Aluminosilicate glasses, and Lithium aluminosilicate glasses.

For the compositions disclosed herein, all values given, both in the description and in the claims, are given in percent by weight (wt %), unless otherwise stated for a particular composition.

For a person skilled in the art, borosilicate glasses are in particular glasses which contain the following constituents (in wt %):

| | |
|---|---|
| $SiO_2$ | 70-87 |
| $B_2O_3$ | 7-25 |
| $Na_2O + K_2O$ | 0.5-9 |
| $Al_2O_3$ | 0-7 |
| CaO | 0-3. |

A first preferred borosilicate glass has the following composition and comprises:

| | |
|---|---|
| $SiO_2$ | 70-86 wt % |
| $Al_2O_3$ | 0-5 wt % |
| $B_2O_3$ | 9.0-25 wt % |
| $Na_2O$ | 0.5-5.0 wt % |
| $K_2O$ | 0-1.0 wt % |
| $Li_2O$ | 0-1.0 wt %. |

A second preferred borosilicate glass is an alkali borosilicate glass with good properties for thermal toughening. It contains

| | |
|---|---|
| $SiO_2$ | 78.3-81.0 wt % |
| $B_2O_3$ | 9.0-13.0 wt % |
| $Al_2O_3$ | 3.5-5.3 wt % |
| $Na_2O$ | 3.5-6.5 wt % |
| $K_2O$ | 0.3-2.0 wt % |
| CaO | 0.0-2.0 wt %. |

Aluminosilicate glasses may preferably have the following composition, in wt %:

$SiO_2$ 55 to 65
$Na_2O$ more than 12 to 17
$Al_2O_3$ 16.5 to 20
$K_2O$ 2 to 4.4
MgO 3.9 to 10
$ZrO_2$ 0 to 5
ZnO 0 to 4
CaO 0 to 4
$Na_2O+K_2O+MgO+ZnO+CaO$ 15 to 28
$SnO_2$ 0 to 1
$TiO_2+CeO_2$ less or equal to 1.

Lithium aluminosilicate glasses may have a composition containing the following constituents (in wt %):

$SiO_2$ 60 to 75
$Al_2O_3$ 10 to 28, and
$Li_2O$ 3 to 15.

Advantageously, a lithium aluminosilicate glass can be used which comprises a composition, in mol %, consisting of:

| | |
|---|---|
| 60-70 | $SiO_2$ |
| 10-13 | $Al_2O_3$ |
| 0.0-0.9 | $B_2O_3$ |
| 9.5-15 | $Li_2O$ |
| 8.2-<12 | $Na_2O$ |
| 0.0-0.7 | $K_2O$ |
| 0.0-0.2 | MgO, or 0.0-1.0 of MgO |
| 0.2-2.3 | CaO |
| 0.0-0.4 | ZnO |
| 1.3-2.6 | $ZrO_2$ |

| | |
|---|---|
| 0.0-0.5 | $P_2O_5$ |
| 0-0.1 | $Fe_2O_3$, preferably 0.0003-0.100 $Fe_2O_3$ |
| 0.0-0.3 | $SnO_2$ |
| 0 -0.2 | $CeO_2$, preferably 0.0004-0.200 $CeO_2$. |

Here, the lithium aluminosilicate glass preferably has a Young's modulus of at least 80 GPa; has a glass transition temperature $T_g$ of less than 540° C. and/or a processing temperature of less than 1150° C.; is suitable for being formed using a float process; and can be toughened chemically and/or thermally, so that it has a bending strength of at least 550 N/mm², measured according to the double-ring method in compliance with EN 1288-5

According to a preferred embodiment of the invention, for example in a laminated glass, in particular for a motor vehicle, a second glass sheet comprises a thin glass substrate hot-formed by the process according to the invention comprising a lithium aluminosilicate glass with an $Li_2O$ content from 4.6 wt % to 5.4 wt % and an $Na_2O$ content from 8.1 wt % to 9.7 wt % and an $Al_2O_3$ content from 16 wt % to 20 wt %.

According to a further embodiment of the invention, the first glass sheet in a laminated glass, for example, in particular for a motor vehicle, comprises a lithium aluminosilicate glass with an $Li_2O$ content from 4.6 wt % to 5.4 wt % and an $Na_2O$ content from 8.1 wt % to 9.7 wt % and an $Al_2O_3$ content from 16 wt % to 20 wt %.

According to a further embodiment of the invention, the second glass sheet in the form of a thin glass substrate of the laminated glass comprises the following constituents:

| | |
|---|---|
| 58 to 65 wt % | $SiO_2$ |
| 16 to 20 wt % | $Al_2O_3$ |
| 0.1 to 1 wt % | $B_2O_3$ |
| 4.6 to 5.4 wt % | $Li_2O$ |
| 8.1 to 9.7 wt % | $Na_2O$ |
| optionally 0.05 to 1.0 wt % | $K_2O$ |
| 0.2 to 2.0 wt % | CaO |
| 2.5 to 5.0 wt % | $ZrO_2$. |

Optionally, one or more of the constituents $SnO_2$, $CeO_2$, $P_2O_5$, and ZnO may be included in a proportion of 0 wt % to 2.5 wt % in total.

Another preferred composition range for a thin glass substrate, in particular for the second glass sheet, comprises:

| | |
|---|---|
| 60 to 62 wt % | $SiO_2$ |
| 17.5 to 19.5 wt % | $Al_2O_3$ |
| 0.5 to 0.7 wt % | $B_2O_3$ |
| 4.8 to 5.2 wt % | $Li_2O$ |
| 8.5 to 9.5 wt % | $Na_2O$ |
| 0.2 to 0.5 wt % | $K_2O$ |
| 0.5 to 1.2 wt % | CaO |
| 3.2 to 3.8 wt % | $ZrO_2$. |

Optionally, one or more of the constituents $SnO_2$, $CeO_2$, $P_2O_5$, and ZnO may be included in a proportion of 0.25 wt % to 1.6 wt % in total.

FIG. 17 is a schematic view, not drawn to scale, of a laminated glass pane 59 comprising a first glass sheet 60, a polymeric layer 61 disposed between and bonding the first glass sheet 60 and the second glass sheet 62, and finally the second glass sheet 62.

More generally, however, without being limited to the exemplary embodiment illustrated here, it is also possible for the laminated glass pane to comprise more than two glass sheets. For example, this may be the case when particularly high mechanical loads are expected and, accordingly, a particularly high strength of the laminated glass pane is intended.

The polymerized layer 61 has a thickness between at least 0.5 mm and at most 1.7 mm. It may be provided in the form of a film, for example a film comprising EVA and/or polyvinyl butyral, or in the form of a layer comprising a plurality of films, or a multilayer film. But it is also possible to form the polymeric layer in situ, by applying monomers to one of the two glass sheets 60, 62 and starting a polymerization reaction. Generally, it is also possible to form the polymeric layer 61 from laminated films. In particular, the films may also comprise PET and/or PE. In the case of a multilayer film, the layers may have different compositions and physical properties. Generally, the film or a layer of a multilayer film may have a low-E coating or a so-called solar control coating.

Furthermore, in the illustrated embodiment, the first glass sheet 60 has a greater thickness than the second glass sheet 62. This is advantageous, for example, if the first glass sheet has a lower intrinsic strength than the glass sheet 62, and so the thickness of the first glass sheet 60 is increased accordingly to ensure a sufficient strength of the laminated glass pane 59 as a whole.

The second glass sheet 64 preferably has a thickness between at least 0.3 mm and at most 1.5 mm and comprises or consists of the thin glass substrate 54 having reduced drawing streaks as described herein. The thickness of the thin glass substrate 54 is indicated by reference character D only in FIG. 17, by way of example, but is meant as a disclosure for all other embodiments of the thin glass substrate 54 described herein.

The glasses of the first and second glass sheets 60, 62 are preferably matched to one another such that the temperatures at which the two glasses of the first and second glass sheets have the same viscosity in the viscosity range between lg η/dPa·s=7 and lg η/dPa·s=10 only differ from each other by a maximum of 50° C., preferably by a maximum of 30° C., more preferably by a maximum of 20° C., and most preferably by a maximum of 10° C.

Preferably, the second glass sheet 62 is provided in the form of a chemically toughened sheet, preferably as a chemically toughened sheet with a compressive stress zone of at least 40 am thickness, the compressive stress being at least 150 MPa and at most 900 MPa.

According to a further embodiment of the invention, the compressive stress is at most 800 MPa, preferably at most 600 MPa. Such compressive stress is achieved in particular by toughening using a sodium nitrate-potassium nitrate mixture.

According to a further embodiment of the invention, the compressive stress is at most 500 MPa, preferably at most 400 MPa, more preferably at most 300 MPa, and most preferably at most 250 MPa. Such compressive stresses can be achieved in particular by toughening using a pure sodium nitrate melt.

Figure 18:
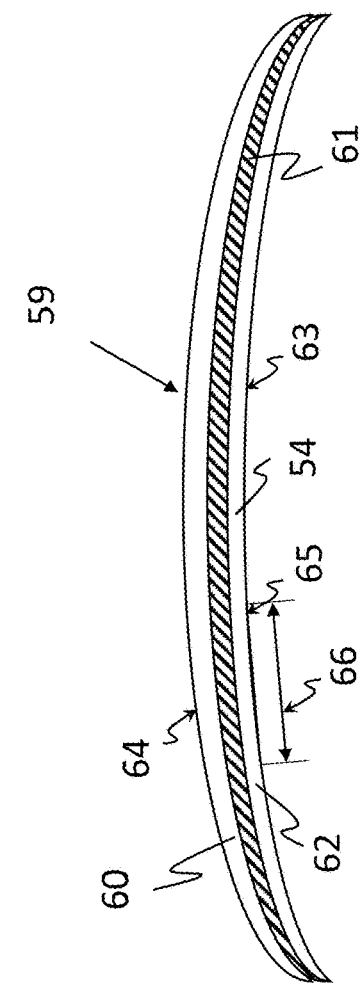

According to an embodiment of the invention shown in FIG. 18, the laminated glass pane 59 is provided in the form of a curved laminated glass pane, in particular as a motor vehicle glazing, so that the outwardly facing side of the second glass sheet 62 is curved concavely. In the case of this shaping for generating the curvature, the thin glass substrate according to the invention of the second glass sheet 62 may be subject to slight thickness variations in the thickness D.

Especially when used as a motor vehicle glazing, both composite glass panes 59 shown in FIGS. 17 and 18 may define a reflection surface 65 for a head-up display, in particular if used for a head-up display in vehicles operated on land, on or in the water, and in the air, in particular motor-powered vehicles. With such use of the laminated glass pane 59, the first glass sheet 60 may face the exterior of the vehicle and the second glass sheet 62 may face the interior of the vehicle. Here, the reflection surface 65 for a head-up display may be provided on that surface 63 of the second glass sheet 62 which faces the interior of the vehicle. In this case, the reflection surface 65 may extend over the entire surface 63 or else may extend only over a portion of the surface 63, which is illustrated by a double arrow 66 in FIGS. 17 and 18, by way of example. Head-up displays are well known to those skilled in the art and therefore require no further detailed discussion.

According to a further embodiment of the invention, the second glass sheet 62 has a zebra angle of greater than or equal to 450, in particular of greater than or equal to 500, most preferably of greater than or equal to 550, at a thickness of 0.7 mm. With regard to the zebra angle and ring-on bending strength mentioned below, reference is made to application document DE 10 2016 125 488 which is also incorporated into the subject matter of the present application by reference, however without claiming priority to this application, since the thin glass substrates corresponding to this prior application DE 10 2016 125 488, in particular also when used for a motor vehicle glazing, are now thin glass substrates with reduced drawing streaks within the scope of the present disclosure, which was not disclosed in the prior application DE 10 2016 125 488.

According to a further embodiment of the invention, the second glass sheet 62 exhibits a ring-on-ring bending strength of more than 150 MPa, in particular more than 250 MPa, preferably more than 300 MPa, more preferably more than 400 MPa, particularly preferably more than 500 MPa, and most preferably more than 600 MPa, and less than 900 MPa.

Furthermore, according to another embodiment, the laminated glass pane 59 is formed such that the second glass sheet 62, at a thickness of 0.7 mm, exhibits a transmittance of more than 91.5% at a wavelength of 840 nm, of more than 91.5% at a wavelength of 560 nm, and of more than 90% at 380 nm. As already mentioned above, this is particularly advantageous for achieving of a good view through the pane 59, so that passenger safety is further improved in this way the.

Preferably, the laminated glass pane 59 is designed such that the temperatures at which the glasses of the first glass sheet 60 and of the second glass sheet 62 have the same viscosity in the viscosity range between lg η/dPa·s=7 and lg η/dPa·s=10 only differ from each other by a maximum of 50° C., preferably by a maximum of 30° C., more preferably by a maximum of 20° C., and most preferably by a maximum of 10° C.

According to yet another embodiment of the invention, the second glass sheet 62 is provided in a chemically toughened form, substantially by an exchange of lithium ions and/or sodium ions by sodium ions and/or potassium ions. A second glass sheet 62 is referred to as being "toughened substantially by an exchange of lithium ions by sodium ions", if the major portion of preliminary stress, i.e. at least 80% of the generated preliminary stress, is caused by the exchange of lithium ions by sodium ions. A glass sheet is in particular toughened substantially by an exchange of lithium ions by sodium ions if the preliminary stress is exclusively achieved by this exchange.

The second sheet 62 may also be made of an aluminosilicate glass in which the chemical toughening was essentially achieved by the exchange of sodium ions by potassium ions.

The second sheet 62 may also be made of a conventional soda-lime glass or a soda-lime glass specially adapted for the chemical toughening, in which, again, sodium ions were exchanged by potassium ions.

FIG. 18 shows the embodiment of a laminated glass pane 59 which may in particular be a motor vehicle glazing. In this case, again, the laminated glass pane 59 comprises a first glass sheet 60, a polymeric layer 61, and a second glass sheet 62. However, this time the laminated glass pane 59 is curved. It is possible in this case that the thickness of the individual glass sheets 60, 62 and of the polymeric layer 61 decreases from the center of the laminated glass pane 59 towards the edges, as shown. However, it is also possible that the individual glass sheets 60, 62 and also the polymeric layer 61 each have a consistent thickness, or that only individual layers 60, 61, 62 of the layers making up the laminated glass pane 59 have a thickness that varies over the cross section of the pane 59. For example, one or more of the layers may be wedge-shaped.

In the present case, the laminated glass pane 59 is formed such that the outwardly facing surface 63 of the second glass sheet 62 is curved concavely.

More generally, without being limited to the example depicted here, the laminated glass pane 59 may as well be formed such that the outwardly facing surface 64 of the first glass sheet 60 is curved concavely.

Yet another preferred composition range for a thin glass substrate, in particular for the second glass sheet of a laminated glass with reduced drawing streaks, comprises:

| | |
|---|---|
| 61 to 62 wt % | $SiO_2$ |
| 17.5 to 18.5 wt % | $Al_2O_3$ |
| 0.5 to 0.7 wt % | $B_2O_3$ |
| 4.9 to 5.1 wt % | $Li_2O$ |
| 8.8 to 9.3 wt % | $Na_2O$ |
| 0.2 to 0.5 wt % | $K_2O$ |
| 0.5 to 1.2 wt % | CaO |
| 3.2 to 3.8 wt % | $ZrO_2$. |

Optionally, one or more of the constituents $SnO_2$, $CeO_2$, $P_2O_5$, and ZnO may be included in a proportion of 0.5 wt % to 1.0 wt % in total.

According to a further preferred embodiment of the invention, the thin glass substrate, in particular the second glass sheet of a laminated glass, has the following composition, in mol %:

| | |
|---|---|
| 60 to 70 | $SiO_2$ |
| 10 to 13 | $Al_2O_3$ |
| 0.0 to 0.9 | $B_2O_3$ |
| 9.6 to 11.6 | $Li_2O$ |
| 8.2 to less than 10 | $Na_2O$ |
| 0.0 to 0.7 | $K_2O$ |
| 0.0 to 0.2 | MgO, or 0.0 to 1.0 of MgO |
| 0.2 to 2.3 | CaO |
| 0.0 to 0.4 | ZnO |
| 1.3 to 2.6 | $ZrO_2$ |

-continued

| | |
|---|---|
| 0.0 to 0.5 | $P_2O_5$ |
| 0.003 to 0.100 | $Fe_2O_3$ |
| 0.0 to 0.3 | $SnO_2$ |
| 0.004 to 0.200 | $CeO_2$ |

Preferably, the following ratios apply for the composition of the lithium aluminum silicate glass:

$(Li_2O+Al_2O_3)/(Na_2O+K_2O)>2$ $0.8Li_2O/(Li_2O+Na_2O+K_2O)<0.7$ $0.8<CaO+Fe_2O_3+ZnO+P_2O_5+B_2O_3+CeO_2<3$, wherein the glass composition comprises at least four of the six oxides.

Furthermore preferably, the lithium aluminum silicate glass has a glass transition temperature $T_g$ of less than 540° C., and/or a processing temperature of less than 1150° C.

The thin glass substrates obtained by the method according to the invention were analyzed and calculated in terms of their dimensions in the Z-direction and their optical properties after having been measured, and the reduction of drawing streaks was determined compared to prior art methods.

In a first series of measurements, measurements were made in the form of thickness measurements of the thin glass substrate on both main surfaces for determining thickness deviations from an ideally plane thin glass substrate, and in a second series of measurements, measurements were made of the elevations or drawing streaks on the upper main surface of the thin glass substrate 54.

So, the data of the first measurement series capture the optical effect of a thin glass substrate when light passes through the upper and lower main surfaces and also describe this effect on the basis of the resulting optical refractive powers defined by the two surfaces. This allows to describe effects on optical beam paths of sensing devices, for example, which are disposed behind the thin glass substrate 54 and which may be used for sensing the surroundings of a motor vehicle, for example.

The data of the second measurement series capture the optical effects of only one main surface, for example as will occur in thin glass substrates 54 that are used in transmitted light, for example if the thin glass substrates have been ground flat and polished on one side or are embedded in a material with the same refractive index on one side, for example in a laminated glass pane.

Below, reference is first made to FIG. 5 for the explanation of the first series of measurements, i.e. the measurements of both main surfaces for determining thickness deviations from an ideally plane thin glass substrate. This figure schematically illustrates a measuring field for measuring the optical path length between the upper main surface and the lower main surface and, thus, of dimensions in Z-direction. A laser interferometer, in particular a phase shift interferometer, was used to carried out measurements over the entire upper main surface 53 of the thin glass substrate 54.

Main surface of a thin glass substrate or glass substrate is usually understood to mean the two opposite faces of the substrate each exhibiting the largest surface area.

Furthermore, a field of analysis 52 is shown, in which the evaluations were made as described below, the results of which are given in Table 1. In the field of analysis 52, contour lines $V_{L1}$ and $V_{L2}$ are moreover shown by way of example, which indicate, merely schematically, a warpage V in comparison to an ideally plane thin glass substrate 54, which warpage is illustrated greatly exaggerated for the sake of clarity. Such warpage V typically rises in positive or negative Z-direction with respect to the main planes of an ideally plane thin glass substrate 54 and may be symmetrical in the drawing or Y-direction, in particular symmetrical to the center line M, and may extend longitudinally in the drawing or Y-direction. Although the contour lines $V_{L1}$ and $V_{L2}$ are only shown for the field of analysis 52 by way of example, such warpage may also extend over the entire thin glass substrate 54 for the subsequent meteorological explanations. Here, the value of warpage V gives the maximum distance of a point on a main surface of the warped thin glass substrate relative to a corresponding point on the main surface of an ideally plane thin glass substrate.

After the method according to the invention had been carried out and prior to the respective measurement of thickness deviation, the thin glass substrate was cut out of the glass ribbon 13 in the form of a rectangular substrate. The measurements of thickness deviation were performed on a circular measurement surface area with a diameter of 300 mm in the form as shown in FIG. 5.

For comparison, a prior art thin glass substrate was also cut out of a glass ribbon in the same manner and subjected to the subsequent measurement and evaluation. It was ensured that all measured thin glass substrates were taken from the center of the glass ribbon after the hot forming, perpendicular to the drawing direction, i.e. from the center of the glass ribbon 13 in X-direction.

Measurements were performed on the main surface 53 in Z-direction of the Cartesian coordinate system, and the thin glass substrate 54 was supported on a flat surface with its main surfaces parallel to the X-Y plane, as was the case for all other measurements disclosed herein.

Measurements of thickness deviation from an ideally plane glass substrate were made, which are referred to as thickness variation $D_m/m$ in Table 1, and thereby measurements of the elevation of the two main surfaces in Z-direction, by measuring the difference in optical path length between the upper and lower main surfaces with respect to an ideally plane glass substrates.

This measurement of the thickness deviations from an ideal plane substrate defined by the thickness of the elevations of both faces, i.e. thickness variations or varicose thickness variations of a first series of measurements, was carried out using a ZYGO laser interferometer (phase shift interferometer).

The laser interferometer was a Fizeau interferometer with an aperture of 300 mm. A Zygo Verifire system with a (circular) measuring spot of 30 cm was used.

Measurements were performed in the QPSI™ rapid mechanical phase-shifting mode, and the camera setting was 1024×1024, corresponding to 1024 measurement points in the X- and Y-directions.

Measurement uncertainty in Z-direction was <30 nm, corresponding to lambda/20 at a wavelength of 633 nm.

Lateral uncertainty in X- and Y-directions was 0.31 mm.

Piston Zernike Removal was activated, and data were only used to suppress the influence of a wedge-shaped thickness variation K and of warpage V, and the Zygo Mx software (version 7.0.0.15) was used with a Gaussian spline filter high-pass with a cutoff of 40 mm. Spline Beaton coefficient and spline tension controls were set to default settings.

The influence of the wedge-shaped thickness variation K and of warpage V could be reduced to a value of less than 5% with the filtering described above with respect to the measurement result of the measurement of the respective thickness variation $D_m/m$. This allowed the measurement of thickness variation $D_m/m$ at the respective point of measurement to be corrected for wedge-shaped thickness variations and warpage.

For a better understanding about how such thickness or surface measurements can be converted into optical powers, the following explanations are given.

The optical refractive power $P(x,y)$ of a surface of a glass, in particular of a thin glass substrate that has elevations in Z-direction of a height H is obtained if it is determined along a straight line extending in the X-direction at a fixed value of y:

$$P(x) = (n-1)\kappa(x) = (n-1)\frac{z''(x)}{(1+z'(x)^2)^{\frac{3}{2}}}$$

Here, n represents the refractive index of the measured thin glass substrate and had a value of 1.525 in each case in the measured thin glass substrate; $z'(x)$ and $z''(x)$ are the first and second derivatives of height $z(x)$ in X-direction; and $z(x)$ is the height H in Z-direction at location x.

Furthermore, the following applies to the total refractive power of both main surfaces of thin glass substrate 54:

$$P_{total}(x) = P_{top}(x) + P_{bottom}(x)$$

wherein $P_{total}(x)$ is the total refractive power of both main surfaces of the thin glass substrate at location x;

$P_{top}(x)$ is the refractive power of the upper main surfaces of the thin glass substrate at location x; and $P_{bottom}(x)$ is the refractive power of the lower main surfaces of the thin glass substrate at location x.

With the method of thickness measurement of $P_{total}(x)$ at location y and with the method of the second series of measurements by Fourier interferometry as will be described below, it was possible to measure both the upper main surface 53 as values $z_{top}(x)$ and the lower main surface with values $z_{bottom}(x)$ of the thin glass substrate 54 at location y, to determine their refractive powers $P_{top}(x)$ and $P_{bottom}(x)$, and to indicate, based thereon, the total refractive power $P_{total}(x)$ of the thin glass substrate 54, or only the refractive power $P_{top}(x)$ or $P_{bottom}(x)$ of only one of the two main surfaces of the thin glass substrate 54.

The influence of the thickness of the thin glass substrate 54 which was assumed to be ideally plane except for the elevations could be neglected, in particular because the optical path length within the thin glass substrate had only a negligible influence on the optical powers.

The thickness variation of the thin glass substrate, which is also referred to as a varicose variation, is resulting from these measurements at the location y at which the respective linear measurement scan was performed in the X-direction when measuring the second series of measurements described below:

$$D(x) = z_{bottom}(x) - z_{top}(x) - D_{glass}(x).$$

wherein $z_{bottom}(x)$ is the distance to the lower main surface of the thin glass substrate at location x;

$z_{top}(x)$ is the distance to the upper main surface of the thin glass substrate at location x;

$D_{glass}$ is the thickness of the assumingly ideally plane-parallel thin glass substrate at location x.

Due to the filtering of the measured thin glass substrates taken from the center of the glass ribbon described herein, the influence of a wedge-shaped thickness variation K and of warpage V could be reduced and so this influence on the measurement could be eliminated.

The values of $P_{top}(x)$, $P_{bottom}(x)$ determined from the measured values measured by Fourier interferometry of the second series of measurements described below and of $P_{total}(x)$ as measured by the white light interferometer, in particular the Zygo white light interferometer of the first series of measurements represent considerably more precise data for the optical performance of a thin glass substrate, in particular for the achievable resolution and the contrast that can be obtained within an optical system, than could be obtained by prior art shadow casting techniques.

This is in particular true if the thin glass substrates according to the invention form part of a windshield projection device, in particular of a head-up display for vehicles operated on land, on or in the water, and in the air, or if optical sensors for detecting the surroundings of such a vehicle are arranged behind such thin glass substrates.

In these first and second series of measurements, a thin glass substrate 54 made of a glass of 0.7 mm thickness was used in each case, by way of example, which had the following composition:

| | |
|---|---|
| 60 to 62 wt % | $SiO_2$ |
| 17.5 to 19.5 wt % | $Al_2O_3$ |
| 0.5 to 0.7 wt % | $B_2O_3$ |
| 4.8 to 5.2 wt % | $Li_2O$ |
| 8.5 to 9.5 wt % | $Na_2O$ |
| 0.2 to 0.5 wt % | $K_2O$ |
| 0.5 to 1.2 wt % | CaO |
| 3.2 to 3.8 wt % | $ZrO_2$. |

In this glass, one or more of the constituents $SnO_2$, $CeO_2$, $P_2O_5$, and ZnO could be included in a proportion from 0.25 wt % to 1.6 wt % in total.

Since the present measured values were measured in X-direction and respective values of the measurements along parallel lines in X-direction were juxtaposed to acquire the values in the Y-direction, the associated X-values of this line were obtained for each line of a Y-value.

With this line by line scanning with the measurement described above, it was possible to capture the entire thickness deviation of the thin glass substrate 54 in both the X- and Y-directions. The square field of analysis 52 of FIG. 5, which was evaluated for Table 1 below, had a size of 18*18 $cm^2$.

This is a one-dimensional approximation combined to give a two-dimensional image of the main surface 53. However, this approximation is justified since waviness and strong curvature only occurred perpendicular to the drawing direction and thus in the X-direction and therefore could be detected accordingly. The structure of the elevations, i.e. of the drawing streaks which extended substantially in the drawing direction longitudinally, i.e. in the Y-direction, as can be seen from FIG. 6, allowed for this approximation.

In order to provide corresponding values with the present method, in particular the method of the second series of measurements, also for prior art methods in which the deflection angle of parallel light is measured in the shadow casting technique, for example, and to calculate these values, for example in arc minutes, this deflection angle can be determined as follows, using the presently measured values for a respective one of the main surfaces of the thin glass substrate, for example with the method of the second series of measurements disclosed herein, by Fourier interferometry. The deflection angle is then calculated based on the provided values according to the following formula, in arc minutes:

$$\frac{\text{ArcTan}(z'(x))}{60}$$

This deflection angle substantially corresponds to the prior art measurement methods, and consequently this value can also be provided using the measurement and analysis method described above.

Figure 6:
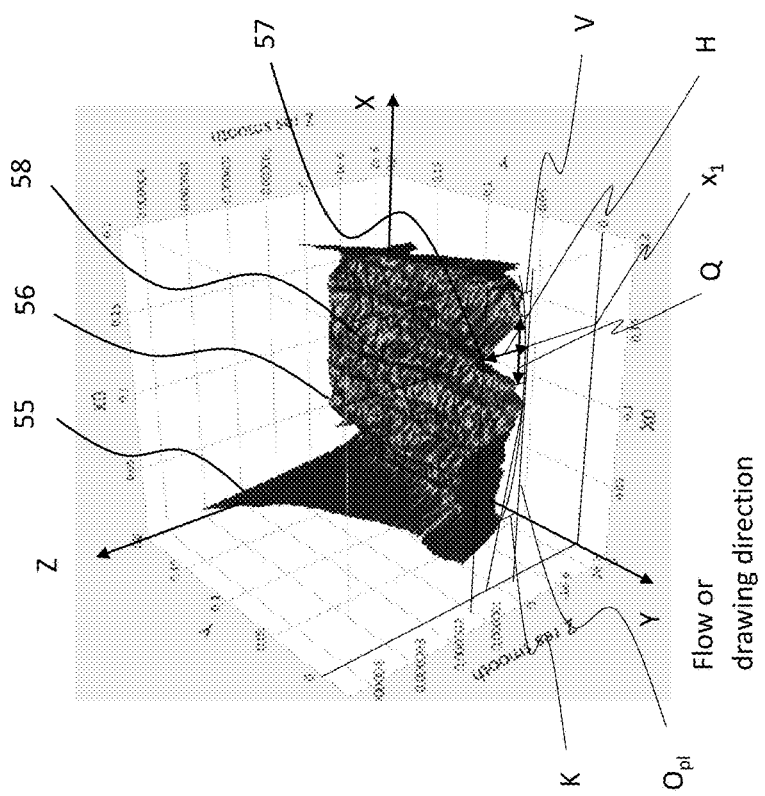
FIG. 6 is a perspective diagram of surface data obtained by the laser interferometer, in particular of the surface texture of a thin glass substrate, in arbitrary units.

FIG. 6 illustrates, in a perspective view and by way of example, the measured values obtained in the second series of measurements for the upper surface, i.e. the main surface 53 of the aforementioned thin glass substrate 54 using the Fourier transform white light interferometer, FRT interferometer, in arbitrary units.

It can clearly be seen from this view, that elevations have formed on the main surface 53 of the thin glass substrate 54, in particular elongated elevations which rise substantially in the normal direction and thus in Z-direction and extend substantially in the drawing direction with their longitudinal extent, i.e. in Y-direction. For these elongated elevations that are also referred to as drawing streaks, the longitudinal extent in Y-direction was more than twice, in particular more than three times, and usually more than five times the transverse extent of the respective elevation in X-direction. These elevations known as drawing streaks are designated by reference numerals 55 to 58 in FIG. 6. The transverse extent Q of elevation 57 in X-direction is indicated by a double arrow Q as an example for the respective transverse extent of an elevation and represents the greatest extent of an elevation perpendicular to the longitudinal extension thereof and therefore transversely to the longitudinal extension of the elevation or drawing streaks defined by this elevation.

Furthermore, the height H of drawing streak 57 or elevation 57 at the location y=0, x=$x_1$ is given by a value of z=H, illustrated by a double arrow, as an example for the height measurement of all other points on the measurement or analysis surface area 52. This height H corresponds to the measured height $z_{top}(x)$ at the location y=0 of the Cartesian coordinate system of the main surface 53 of thin glass substrate 54 with respect to an ideally plane surface. The ideally plane surface is illustrated in FIG. 6 as a reference line $O_{pl}$, for the locations y=0 in X-direction.

Furthermore, reference character K indicates a wedge-shaped variation in thickness, and reference character V represents a warpage with respect to an ideally plane surface.

Figure 11:
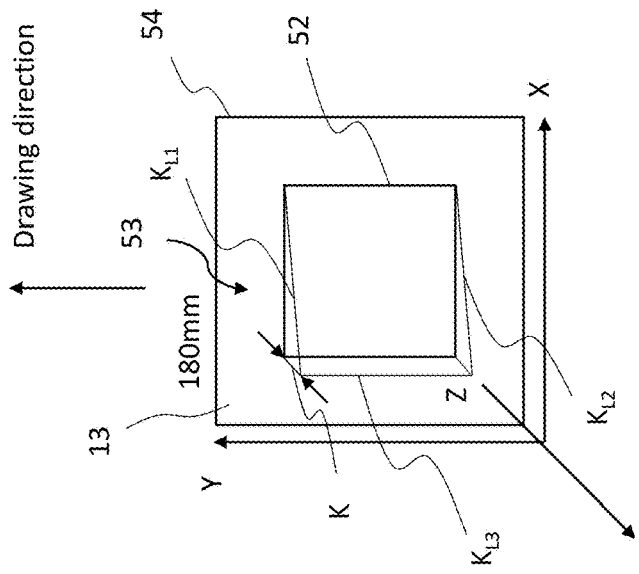
FIG. 11 is a schematic diagram of a measuring field and a field of analysis on the main surface of a thin glass substrate for measuring the optical path length using a white light interferometer, in particular a Fourier transform white light interferometer, FRT interferometer.

These elevations defining drawing streaks had a mean height H in Z-direction which was smaller than 100 nm in each measured case, adjusted for wedge-shaped thickness variations and warpage, and with arithmetic averaging of the analysis surface area 52 of FIG. 11 of 10*10 cm$^2$, preferably measured in the center of a hot-formed glass ribbon perpendicular to the drawing direction, i.e. in X-direction.

A particularly preferred embodiment of the measured thin glass substrate 54 even exhibited a height H of the elevations in Z-direction which was on average smaller than 90 nm and even smaller than 80 nm, adjusted for wedge-shaped thickness variations and warpage.

Figure 5:
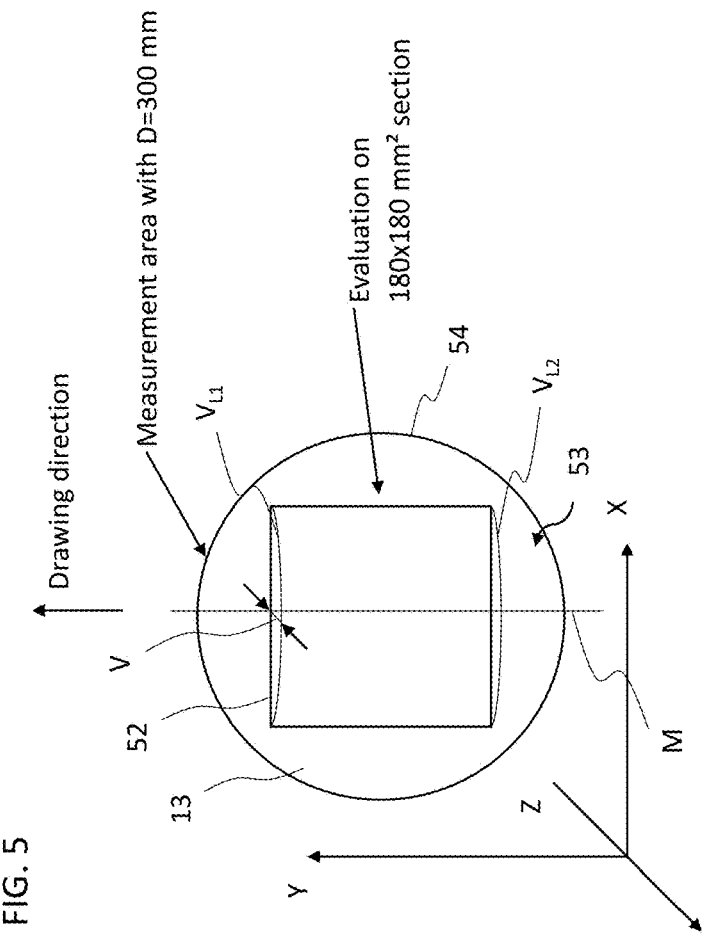
FIG. 5 is a schematic view of a measuring field and a field of analysis on the main surface of a thin glass substrate for measuring the optical path length using a laser interferometer, in particular a phase-shift interferometer.

For averaging the thickness deviations, also referred to as thickness variations, arithmetic averaging of the measured values filtered as described above was again carried out over the entire analysis surface area 52 of FIG. 5 of 18*18 cm$^2$.

With the method according to the first series of measurements described above, the following measurements of thickness variations or thickness deviations of the thin glass substrate 54 were obtained, as given in Table 1.

TABLE 1

| 40 mm filter | $D_m$/m | $(\Delta D/\Delta x)_m$/ (m/mm) | (Opt. power)$_m$/dpt |
|---|---|---|---|
| Thin glass old | 156.5E−09 | 68.5E−09 | 34.1E−03 |
| Thin glass new | 105.3E−09 | 37.3E−09 | 19.9E−03 |

In TABLE 1 above, the decimal exponents are given as values of E in each case, for example E-9 was used for the factor*$10^{-9}$, and E-3 for the factor $10^3$, for the sake of brevity.

In the TABLE 1, the term optical refractive power $P_a(x)$ was abbreviated as 'Opt. power', so indicating the total refractive power of both main surfaces of the thin glass substrate at location x.

In the TABLE 1 as well as in the further description and in the claims, a respective subscript m indicates that the respectively denoted value was arithmetically averaged over the entire field of analysis in the X-direction.

The values referred to as 'thin glass old' in TABLE 1 and TABLE 2, respectively, were obtained from a prior art thin glass substrate having the same glass composition as the thin glass substrate according to the invention, which is referred to as 'thin glass new' in TABLES 1 and 2.

From TABLE 1 it can be seen that the thickness values of the elevations or drawing streaks, filtered and arithmetically averaged as described above, are considerably reduced. For example, in the center of the glass ribbon 13 (in X-direction and thus perpendicular to the flow direction) a decrease from a mean value of 156*$10^{-9}$ m to a value of 105*$10^{-9}$ m is observed.

This TABLE 1 also shows significantly reduced arithmetically averaged slope values $(\Delta D/\Delta x)_m$/(m/mm), which also lead to significantly reduced averaged deflection angles with the deflection angle equation given above. The same applies to the measured and analyzed values of optical powers.

Based on these averaged values of the measurements filtered as described above, it was found for a 97.5% quantile that 97.5% of the measurement points exhibited a varicose thickness deviation, i.e. a thickness deviation of both main surfaces in total, which was less than 292 nm for the thin glass substrates hot formed by the method according to the invention, and which was less than 441 nm in the case of the conventionally hot formed thin glass substrate.

For $(\Delta D/\Delta x)_m$, the value for the prior art thin glass substrates was found to be less than 187*$10^{-9}$/(m/mm) for 97.5% of the measurement points, and less than 108*$10^{-9}$ m/mm for the thin glass substrates according to the invention.

As to the optical power, for 97.5% of the measuring points a value of less than 99 mdpt was resulting for the prior art thin glass substrates, filtered as described above, i.e. with the influences of wedge-shaped thickness variation K and warpage V eliminated, and averaged, and a value of less than 66.0 mdpt was resulting for the thin glass substrates according to the invention.

Figure 8:
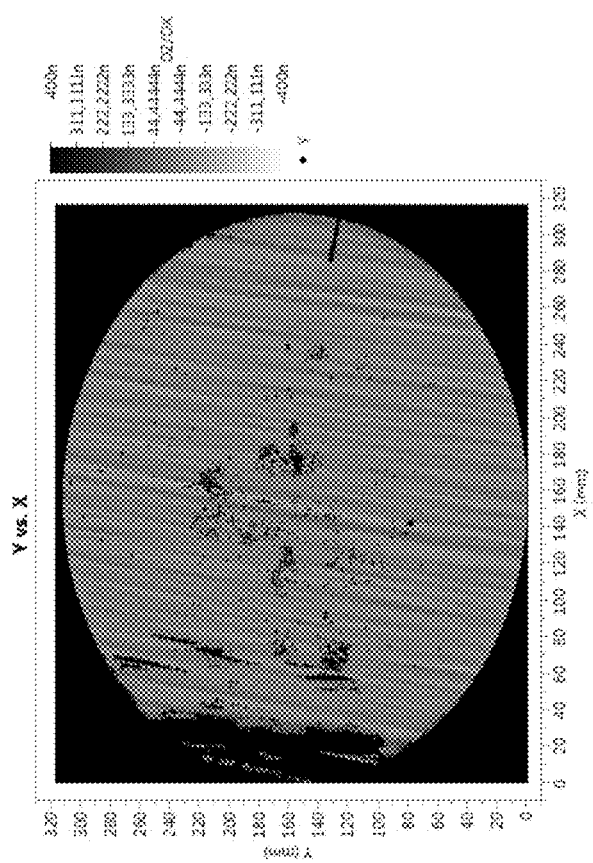
FIG. 8 shows a grayscale diagram of a derivative in X-direction of the surface data of a thin glass substrate on which the first and second series of measurements were taken, obtained by the laser interferometer, in which the derivative values are shown as grayscale values.
Figure 7:
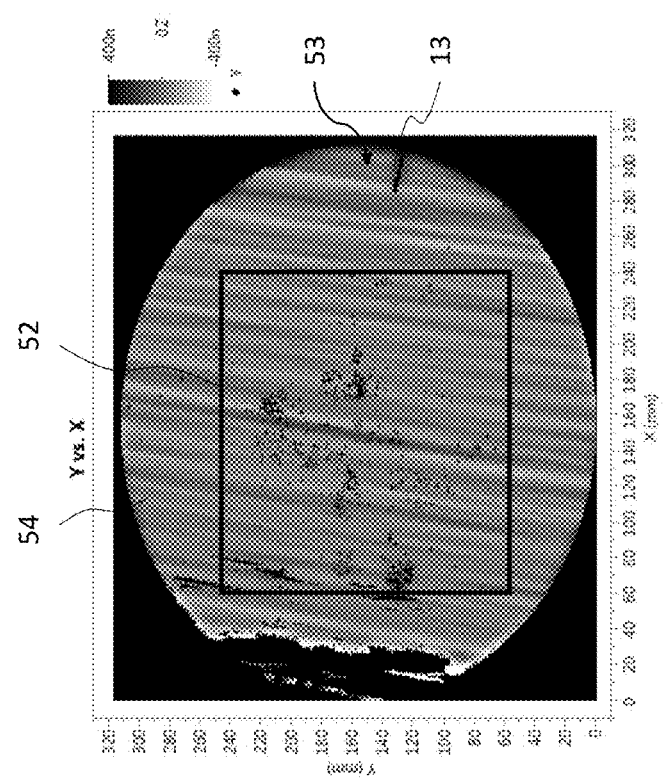
FIG. 7 shows a grayscale diagram of surface data of a thin glass substrate on which the first and second series of measurements were taken, obtained by the laser interferometer, in which the thickness values of drawing streaks are shown as grayscale levels.

For illustrating purposes, FIGS. 7 to 10 show further results in the form of grayscale images, with FIG. 7 showing a grayscale diagram of surface data of the thin glass substrate 54 according to the invention as obtained using the laser interferometer, in which the thickness data of drawing streaks are represented as grayscale values, and FIG. 8 showing a grayscale diagram of the derivation in X-direction of the thickness data obtained by the laser interferometer, i.e. varicose surface data of the thin glass substrate 54, in which the derivative values are represented as grayscale values.

The diagrams of FIGS. 7 to 16 do not show raw data of the respective measurement, but rather already include corrections of warpage introduced by filtering, which will be described in more detail below for the respective measurement series.

Figure 10:
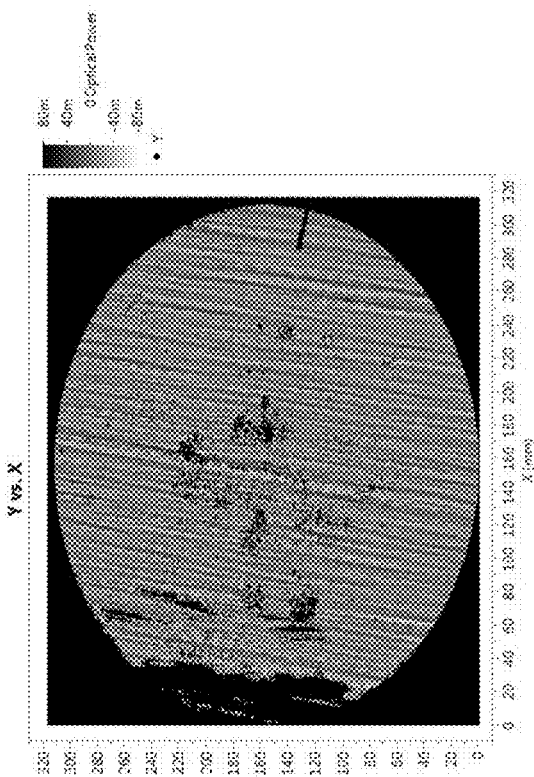
FIG. 10 shows a grayscale diagram of optical powers of the surface data of a thin glass substrate according to the invention on which the first and second series of measurements were taken, obtained by the laser interferometer, in which the refractive powers are shown as grayscale values.
Figure 9:
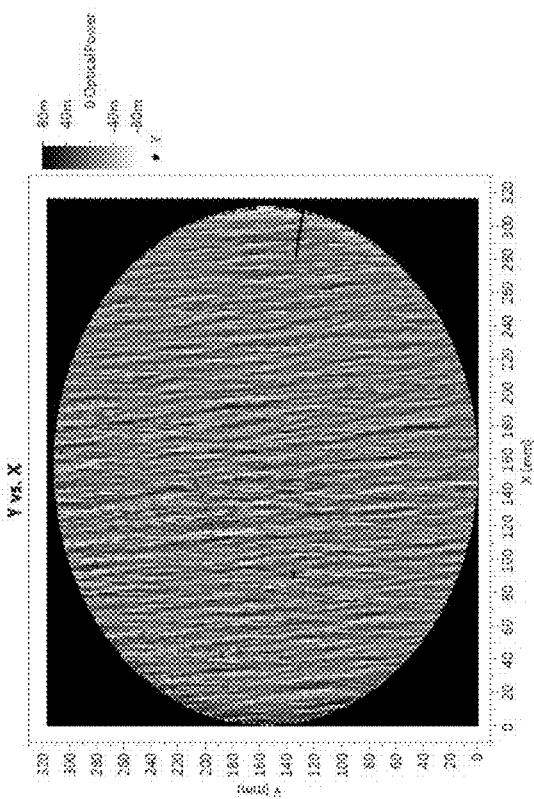
FIG. 9 shows a grayscale diagram of optical powers of the surface data of a prior art thin glass substrate on which the first and second series of measurements were taken, obtained by the laser interferometer, in which the optical powers are shown as grayscale values.

FIG. 9 shows a grayscale diagram of optical powers of the surface data of a prior art thin glass substrate obtained by the laser interferometer, and FIG. 10 shows a grayscale diagram of optical powers of a substrate according to the invention, in which the refractive powers are also represented as gray values.

It can clearly be seen that the optical powers of the thin glass substrate according to the invention are substantially lower than those of the prior art thin glass substrate.

The above values were supplemented by a second series of measurements using a second measurement method which was performed using a white light interferometer, in particular a Fourier transform white light interferometer, FRT interferometer, which will be described below with reference to FIGS. 11 to 14.

Similar to FIG. 5, FIG. 11 schematically illustrates a measurement or analysis field 52 which extends over the entire upper main surface of the square thin glass substrate 54 with a size of 18*18 cm².

In contrast to the view of FIG. 5, a square thin glass substrate of dimensions 18 cm 18 cm and with a field of analysis of 10 cm*10 cm was used for the measurement field 52 shown in FIG. 11. Furthermore, contour lines $K_{L1}$, $K_{L2}$, and $K_{L3}$ are shown in the field of analysis 52 of FIG. 11 by way of example, which indicate, merely schematically, a substantially wedge-shaped thickness variation K of the thin glass substrate 54 compared to an ideally plane thin glass substrate 54, and greatly exaggerated for the sake of clarity. Such substantially wedge-shaped thickness variations K typically rise in the positive or negative Z-direction with respect to the main planes of an ideally plane thin glass substrate 54 and extend longitudinally in the drawing or Y-direction. Although contour lines $K_{L1}$, $K_{L2}$, and $K_{L3}$ are only shown for the field of analysis 52 for the following metrological explanations, by way of example, such wedge-shaped elevations may also extend over the entire thin glass substrate 54. Here, the value of the wedge-shaped thickness variation K gives the maximum distance of a point on a main surface of the thin glass substrate 54 exhibiting the wedge-shaped thickness variation relative to a corresponding point on the main surface of an ideally plane thin glass substrate.

For the measurement of the prior art thin glass substrates, thin glass substrates with the same compositions were used, i.e. the same glasses and the same dimensions as that of the hot formed thin glass substrates according to the invention, both in the first and in the second series of measurements.

In the second series of measurements, a Fourier transform interferometer Microprof® (type MPR 200 30 with sensors FRT CWL 600 µm) was used, manufactured by Fries Research & Technology GmbH, Friedrich-Ebert-Str., D-51429 Bergisch Gladbach.

Conditions were as follows.

The measurement was performed on square surfaces with a surface area of 18*18 cm², but was only evaluated within the field of analysis 52 for the measured values given here.

500 scans were performed, i.e. measurements line by line juxtaposed in the Y-direction, each one with 500 points and a point spacing of 0.36 mm in the X-direction. The offset of the lines in Y-direction was 0.36 mm in each case. Only the upper surface within the field of analysis 52 of a thin glass substrate of 0.7 mm thickness was evaluated, by way of example, i.e. the field of analysis 52 of upper main surface 53.

The scanning unit (gantry design) was operated at a velocity of 15 mm/s as the measuring rate, the possible maximum rate was 300 mm/s. Lateral resolution was less than 2 µm in the X- and Y-directions, and the resolution in vertical direction, i.e. Z-direction, was 6 nm.

The measuring range covered 180×180 mm in the X- and Y-directions, with 500 measured lines with a spacing of 360 µm between the measured lines. 500 measurement points per line were captured, and the spacing between the measurement points was 360 µm in each case.

The measuring direction of the individual scans along the respective measuring line was perpendicular to the drawing direction, i.e. in X-direction, in each case.

The distance between the sensor and the measurement surface was about 3.74 mm, at a thickness of each measured thin glass substrate of 0.7 mm.

The obtained values were smoothed line by line to suppress high-frequency noise.

In order to suppress the influence of warpage V and wedge-shaped thickness variations K of the thin glass substrate, a cubic spline with a flexibility parameter lambda=5 was used, as well as a cubic spline with a flexibility parameter lambda=10000, corresponding to a high-pass filter with a length of 40 mm. For this purpose, the SAS JMP™ program was used.

Both filtered lines were subtracted from each other z(x, lambda=5)−z(x, lambda=10000) to obtain a bandpass filter which essentially only provides the values of the respective measured values actually measured for the elevations z(x) with noise eliminated, which corresponded to a bandpass filter with 3 dB bandpass of about 7-35 mm length.

With the filtering described above, it was possible to reduce the influence of wedge-shaped thickness variation K and warpage V to a value of less than 5% with respect to the measurement result of the measurement of the respective height H. This allowed the height measurement at the respective measurement point to be corrected for wedge-shaped thickness variations and warpage.

The field of analysis 52 with dimensions of 10*10 cm² was also used as a basis for the respective arithmetical averaging for the data of the upper main surface 53 obtained as described above.

Figure 12:
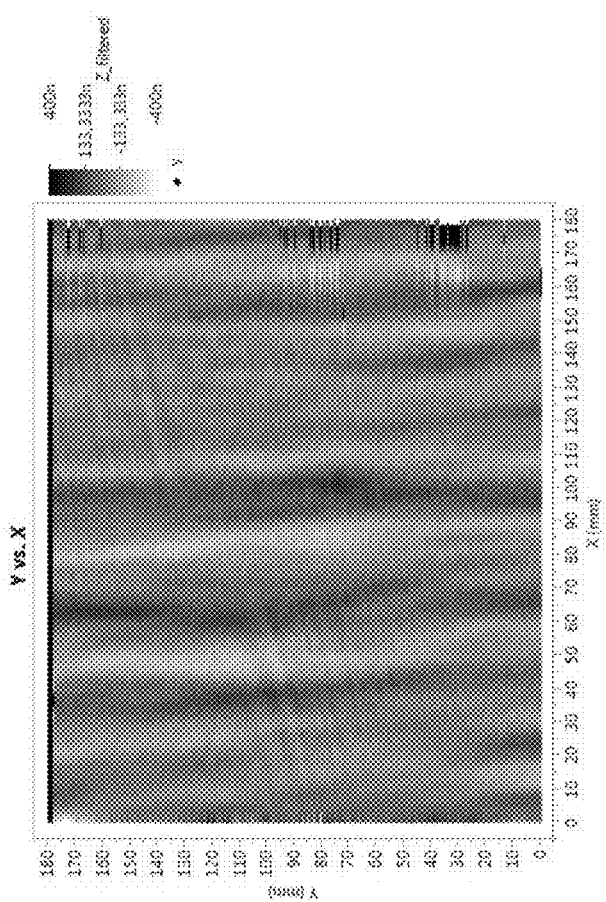
FIG. 12 is a grayscale diagram of surface data of a thin glass substrate on which the first and second series of measurements were performed, obtained by the FRT interferometer, in which the elevation values of drawing streaks on the upper main surface are shown as grayscale values.

FIG. 12 shows, by way of example, a grayscale diagram of surface data of a thin glass substrate 54 according to the invention as obtained by the FRT interferometer, in which the thickness values of drawing streaks are represented as gray values.

Figure 14:
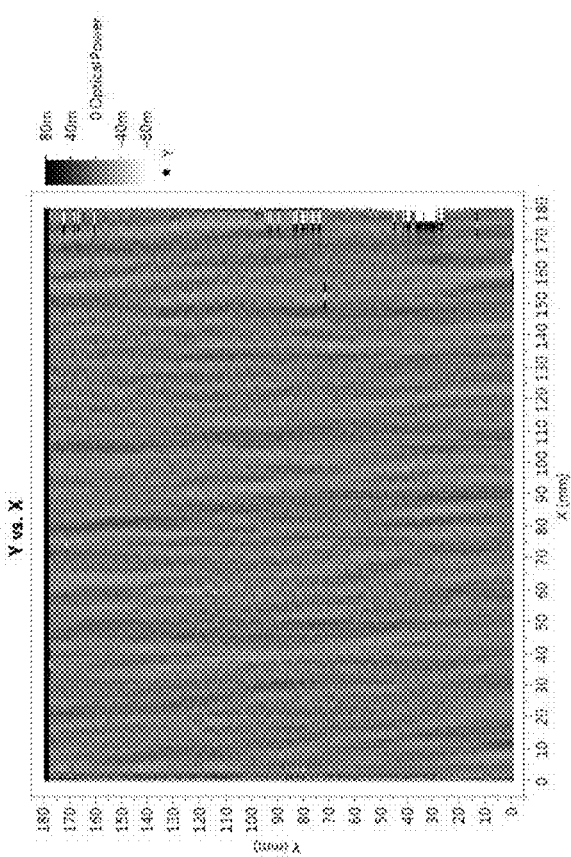
FIG. 14 is a grayscale diagram of optical powers of the surface data of a thin glass substrate according to the invention on which the first and second series of measurements were performed, obtained by the FRT interferometer, in which the optical powers are shown as grayscale values.
Figure 13:
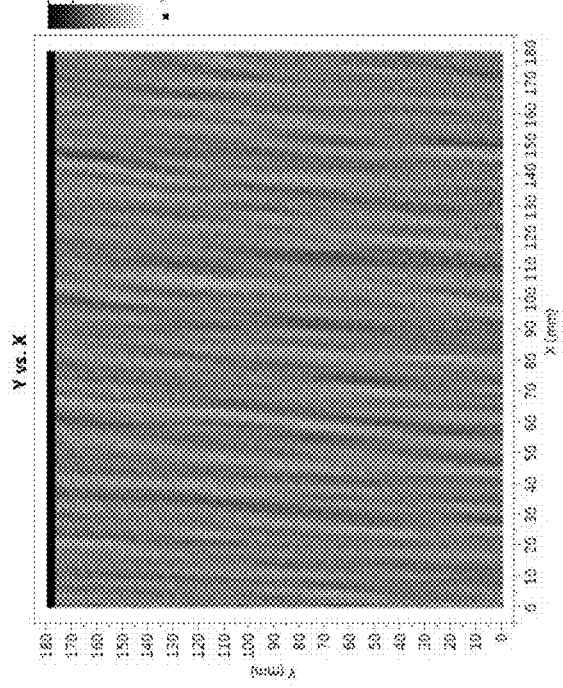
FIG. 13 is a grayscale diagram of optical powers of the surface data of a prior art thin glass substrate on which the first and second series of measurements were performed, obtained by the FRT interferometer, in which the optical powers are shown as grayscale values.

A comparison of prior art thin glass substrates with those according to the invention can be seen in FIGS. 13 and 14, in which FIG. 13 shows a grayscale diagram of optical powers of the surface data of a prior art thin glass substrate as obtained with the FRT interferometer, and FIG. 14 a grayscale diagram of optical powers of the surface data of the upper main surface of a thin glass substrate 54 according to the invention as obtained with the FRT interferometer.

The results listed in TABLE 2 below were obtained as an arithmetic mean averaged over the analysis surface area 52.

TABLE 2

| Spline filter 5-35 mm | $Z_m$/ m | $(\Delta Z/\Delta x)_m$/ (m/mm) | (Opt. power)$_{m, \, singe\text{-}sided}$/ dpt | (Angle)$_m$/ rad |
|---|---|---|---|---|
| Thin glass old | 108.6E−09 | 30.2E−09 | 8.1E−03 | 208E−03 |
| Thin glass new | 70.1E−09 | 20.8E−09 | 6.2E−03 | 142.9E−03 |

In this TABLE 2:

$Z_m$ is the arithmetic mean of the values of height H of the elevations on the analysis surface area 52 on upper main surface 53 of thin glass substrate 54 of 10*10 cm², filtered and therefore adjusted for wedge-shaped thickness variations and warpage;

$(\Delta D/\Delta x)_m$ is the arithmetic mean of the derivative, perpendicular to the drawing direction, of surface waviness of the drawing streaks over an analysis surface area of 10*10 cm²;

(Opt. power)$_{m,single\text{-}sided}$ is the arithmetic mean of the calculated optical power of the upper main surface 53 over an averaging surface area of 10*10 cm²;

(Angle)$_m$ is the arithmetic mean of the calculated deflection angle with a vertically incident beam on the main surface 53, arithmetically averaged over an analysis surface area of 10*10 cm².

Thus, the method for producing a thin glass substrate described herein permitted to form elevations on one of the main surfaces of the thin glass substrate, in particular elongated elevations substantially rising in normal direction, which have a longitudinal extent that is greater than two times, preferably three times, more preferably five times a transverse extent of the elevation, and which have a mean height of less than 100 nm, preferably less than 90 nm, more preferably less than 80 nm, and in the case of a borosilicate glass thin glass substrate less than 85 nm, preferably less than 75 nm, and most preferably less than 65 nm, with arithmetic averaging of an analysis surface area of 10*10 cm², preferably in the center of a hot formed glass ribbon perpendicular to the drawing direction, and with a transverse extent of the elevation smaller than 40 mm in each case.

Not only the averaged values were considerably improved by the method according to the invention, but also the distribution of the absolute values.

97.5% of the measurement points of the hot formed thin glass substrate according to the invention exhibited a deviation, i.e. maximum elevation of the drawing streaks, of less than 173.9 nm in Z-direction, compared to 273.5 nm in case of the conventionally formed thin glass substrate.

For 97.5% of the measurement points, the value of $(\Delta D/\Delta x)_m$/(m/mm) was less than 57.1 for the hot formed glass of the present invention, and 78.3 for the conventionally formed glass. For 97.5% of the measurement points, the value of refractive power, single-sided, was less than 22.3 mdpt for the conventionally formed thin glass substrate, and was less than 17.5 mdpt for the thin glass substrate hot formed according to the invention.

With the method for producing a thin glass substrate, due to the hot forming, the thin glass substrate 54 substantially exhibited a wedge-shaped thickness variation K over a length of 1 m perpendicular to the drawing direction, i.e. in X-direction, of less than 100 μm. Furthermore, due to the hot forming, the thin glass substrate 54 exhibited a warpage V over a length of 1 m perpendicular to the drawing direction, i.e. in X-direction, of less than 600 μm.

In the above description, all averages were arithmetic averages taken within the respective analysis surface area 52, wherein in the thickness measurement, i.e. the measurement of varicose thickness deviation, an analysis and averaging area of 18*18 cm² was used, and in the measurement of the height H of elevations solely on the main surface 53, an analysis or averaging surface area of 10*10 cm² was used.

With the above-described method, due to the hot forming, the thin glass substrate 54 was obtained with an average thickness of 0.3 mm to 2.6 mm, averaged over an area of the first and second main surfaces of the thin glass substrate 54 of at least 10 cm*10 cm.

However, other preferred embodiments of the thin glass substrate 54 with a thickness of 0.7 to 2.5 mm were also obtained, as well as particularly preferred embodiments with a thickness of about 0.7 mm or a thickness of about 2.54 mm. Furthermore, it was even possible to produce glass substrates with a thickness of up to 10 mm or a thickness of up to 12 mm with the method according to the invention.

The following measurements of a third and fourth series of measurements were performed on a borosilicate glass of 2 mm thickness, which had the following composition:

| | |
|---|---|
| $SiO_2$ | 70-86 wt % |
| $Al_2O_3$ | 0-5 wt % |
| $B_2O_3$ | 9.0-25 wt % |
| $Na_2O$ | 0.5-5.0 wt % |
| $K_2O$ | 0-1.0 wt % |
| $Li_2O$ | 0-1.0 wt %. |

This measurement of the thickness deviations from an ideal plane substrate defined by the thickness of the elevations of both faces, i.e. thickness variations or varicose thickness variations of a third series of measurements, was carried out using a ZYGO laser interferometer (phase shift interferometer).

The laser interferometer was a Fizeau interferometer with an aperture of 24". A Zygo Verifire system with a (circular) measuring spot of 24" was used.

Measurements were performed in the standard TWF mode, and the camera setting was 1024×1024, corresponding to 1024 measurement points in each of the X- and Y-directions.

Measurement uncertainty in Z-direction was <30 nm, corresponding to lambda/20 at a wavelength of 633 nm.

Lateral uncertainty in X- and Y-directions was 0.62 mm.

Piston Zernike Removal was activated, and data were only used to suppress the influence of a wedge-shaped thickness variation K and of a warpage V, and the Zygo Mx software (version 7.0.0.15) was used with a Gaussian spline filter high-pass with a cutoff of 40 mm. Spline Beaton coefficient and spline tension controls were set to default settings.

The influence of the wedge-shaped thickness variation K and of the warpage V could be reduced to a value of less than 5% with the filtering described above with respect to the measurement result of the measurement of the respective thickness variation $D_m/m$. This allowed the measurement of thickness variation $D_m/m$ at the respective point of measurement to be corrected for wedge-shaped thickness variations and warpage.

With the method according to the third series of measurements described above, measurements of thickness variations or thickness deviations of the thin glass substrate 54 were obtained as set forth in TABLE 3.

TABLE 3

| 40 mm filter | $D_m/m$ | $(\Delta D/\Delta x)_m/$ (m/mm) | (Opt. power)$_m$/dpt |
|---|---|---|---|
| Boro$_{old}$ | 84.3E−09 | 24.3E−09 | 16.5E−03 |
| Boro$_{new}$ | 59.7E−09 | 21.1E−09 | 16.0E−03 |

In TABLE 3 above, the decimal exponents are given as values of E in each case, for example E-9 was used for the factor*$10^{-9}$, and E-3 for the factor*$10^3$, for the sake of brevity.

In the above table, the term optical refractive power $P_{total}(x)$ was abbreviated as 'Opt. power', thus indicating the total refractive power of both main surfaces of the thin glass substrate at location x.

In the above TABLE 3 as well as in the further description and in the claims, a respective subscript m indicates that the respectively denoted value was arithmetically averaged over the entire field of analysis in the X-direction.

Figure 15:
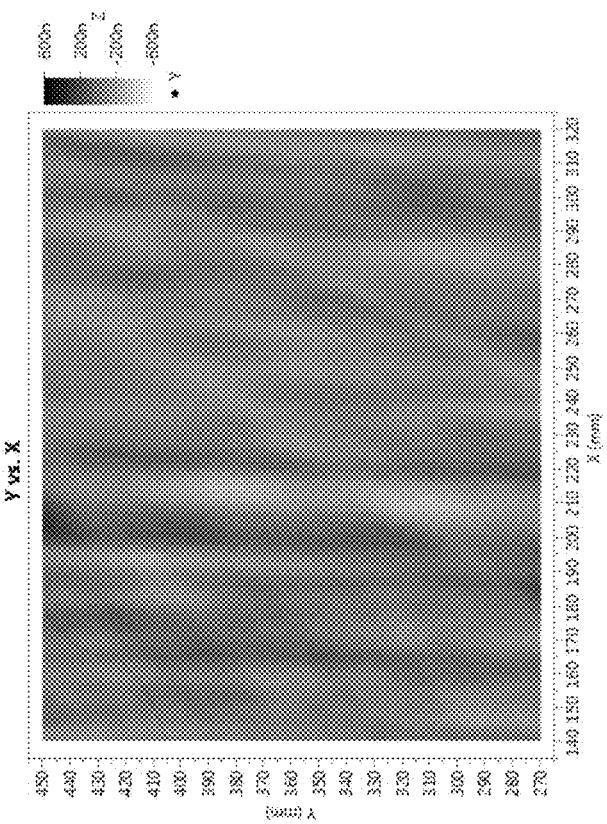
FIG. 15 is a grayscale diagram of surface data of a prior art thin glass substrate on which the third and fourth series of measurements were performed, obtained by the laser interferometer, in which the thickness values of drawing streaks are shown as grayscale values.
Figure 16:
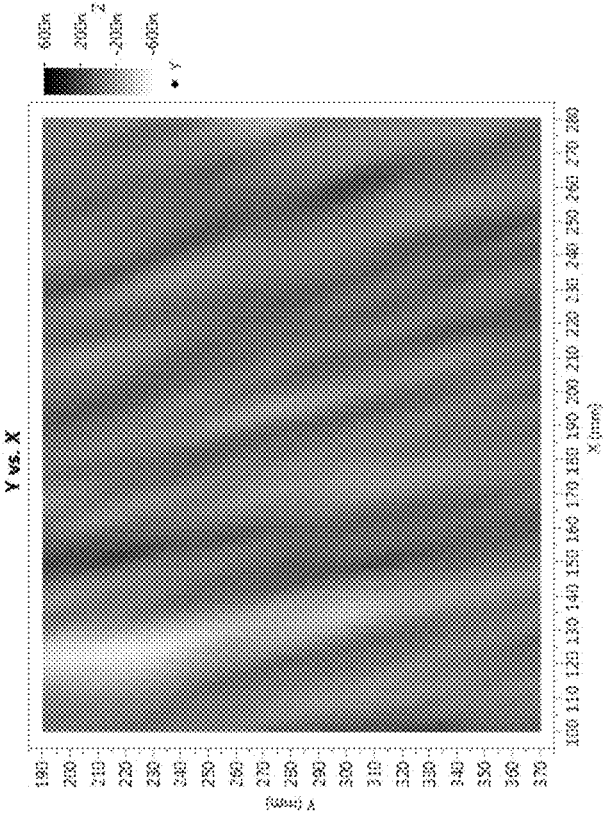
FIG. 16 is a grayscale diagram of surface data of a thin glass substrate hot-formed by the method of the invention, on which the third and fourth series of measurements were performed, obtained by the laser interferometer, in which the thickness values of drawing streaks are shown as grayscale values.

The measurements of the third and fourth series of measurements also reveal values that have been improved with the invention. FIGS. 15 and 16 illustrate further results in the form of grayscale diagrams.

It can clearly be seen that the optical powers of the thin glass substrate according to the invention are substantially lower than those of the prior art thin glass substrate.

The above values of the third series of measurements were supplemented by a fourth series of measurements using a second measurement technique which was performed using a white light interferometer, in particular a Fourier transform white light interferometer, FRT interferometer, which has already been described with reference to FIGS. 11 to 14.

In the fourth series of measurements, a Fourier transform interferometer Microprof® (type MPR 200 30 with sensors FRT CWL 600 μm) was again used, manufactured by Fries Research & Technology GmbH, Friedrich-Ebert-Str., D-51429 Bergisch Gladbach.

Conditions were as follows.

The measurement was performed on square surfaces with a surface area of 18*18 cm², but was only evaluated within the field of analysis 52 for the measured values given here.

500 scans were performed, i.e. measurements line by line juxtaposed in the Y-direction, each one with 500 points and a point spacing of 0.36 mm in the X-direction. The offset of the lines in Y-direction was 0.36 mm in each case. Only the upper surface within the field of analysis 52 of a thin glass substrate of 2 mm thickness was evaluated by way of example, i.e. the field of analysis 52 of the upper main surface 53.

The scanning unit (gantry design) was operated at a velocity of 15 mm/s as the measuring rate, the possible maximum rate was 300 mm/s. Lateral resolution was less than 2 μm in the X- and Y-directions, and the resolution in vertical direction, i.e. Z-direction, was 6 nm.

The measuring range covered 180*180 mm in the X- and Y-directions, with 500 measured lines with a spacing of 360 μm between the measured lines. 500 measurement points per line were captured, and the spacing between the measurement points was 360 μm in each case.

The measuring direction of the individual scans along the respective measuring line was perpendicular to the drawing direction, i.e. in X-direction, in each case.

The distance between the sensor and the measurement surface was about 5.04 mm, for a thickness of each measured thin glass substrate of 2.0 mm.

The obtained values were smoothed line by line to suppress high-frequency noise.

In order to suppress the influence of warpage V and wedge-shaped thickness variations K of the thin glass substrate, a cubic spline with a flexibility parameter lambda=5 was used, as well as a cubic spline with a flexibility parameter lambda=10000, corresponding to a high-pass filter with a length of 40 mm. For this purpose, the SAS JMP™ program was used.

Both filtered lines were subtracted from each other z(x, lambda=5)−z(x, lambda=10000) to obtain a bandpass filter which essentially only provides the respective values actually measured for the elevations z(x), with noise eliminated, which corresponded to a bandpass filter with 3 dB bandpass of about 7-35 mm in length.

With the filtering described above, it was possible to reduce the influence of wedge-shaped thickness variation K and warpage V to a value of less than 5% with respect to the measurement result of the measurement of the respective height H. This allowed the height measurement at the respective measurement point to be corrected for wedge-shaped thickness variations and warpage.

The field of analysis 52 with dimensions of 10*10 cm² was also used as a basis for the respective arithmetical averaging for the data of the upper main surface 53 obtained as described above.

The results listed in TABLE 4 below were obtained as an arithmetic mean averaged over the analysis surface area 52.

TABLE 4

| Spline filter 5-35 mm | $Z_m/$ m | $(\Delta Z/\Delta x)_m/$ (m/mm) | (Opt. power)$_{m,\ single-sided}/$ dpt | (Angle)$_m/$ rad |
|---|---|---|---|---|
| Boro$_{new}$ | 37.7E−09 | 12.0E−09 | 3.6E−03 | 82.4E−03 |

In TABLES 3 and 4:

Boro$_{new}$ is a borosilicate glass hot-formed by the method disclosed herein;

Boro$_{old}$ is a borosilicate glass hot-formed by a prior art method;

$Z_m$ is the arithmetic mean of the values of height H of the elevations on the analysis surface area 52 on upper main surface 53 of thin glass substrate 54 of 10*10 cm², filtered and therefore adjusted for wedge-shaped thickness variations and warpage;

$(\Delta D/\Delta x)_m$ is the arithmetic mean of the derivative, perpendicular to the drawing direction, of surface waviness of the drawing streaks over an analysis surface area of 10*10 cm²;

(Opt. power)$_{m,single\ sided}$ is the arithmetic mean of the calculated optical power of the upper main surface 53 over an averaging surface area of 10*10 cm²;

(Angle)$_m$ is the arithmetic mean of the calculated deflection angle with a vertically incident beam on the main surface 53, arithmetically averaged over an analysis surface area of 10*10 cm².

With the method for producing, in particular hot forming a thin glass substrate as disclosed herein, it was possible to reduce the height of the elevations also known as drawing streaks by at least the value given in the following inequation, as a function of the thickness of the thin glass substrate. The following inequation applies in particular to the thickness-dependent elevation on one of the main surfaces of the thin glass substrate, for which the transverse extent of the elevation is less than 40 mm, on average, adjusted for wedge-shaped thickness variations and warpage, with arithmetic averaging of an analysis surface area of 10*10 cm², $H_{new}/\text{nm} < H_{old}/\text{nm}*(0.85-0.1*D/\text{mm})$, wherein D is the thickness of the thin glass substrate in mm, for a range from 0.3 mm to 2.6 mm; $H_{new}$ is the height, in nm, of the elevation on one of the main surfaces of a thin glass substrate according to the invention; $H_{old}$ is the height, in nm, of the elevation on one of the main surfaces of a prior art thin glass substrate.

Usually, even greater improvements could be obtained, i.e. greater reductions in the height H of the drawing streaks, so that the above inequation merely provides a limit for the benefit that can generally be achieved.

In a strict sense, this inequation applies in particular to thin glass substrates having a thickness from 0.3 mm to 2.6 mm. However, thin glass substrates with a greater thickness than 2.6 mm also exhibited a similar improvement which, however, is no longer correctly reproduced by this inequation for thickness values greater than 2.6 mm, in particular for thickness values of 6 mm and above.

The method according to the invention allows to produce a thin glass substrate in which the thickness-dependent elevation on one of the main surfaces of the thin glass substrate, for which the transverse extent of the elevation is less than 40 mm, adjusted for wedge-shaped thickness variations and warpage, meets the following inequation, on average, with arithmetic averaging of an analysis surface area of 10*10 cm²:

$$\text{SQRT}(D/\text{mm})*H/\text{nm} < 85$$

wherein

D is the thickness of the thin glass substrate, in mm;

H is the height, in nm, of the elevation on one of the main surfaces of a thin glass substrate according to the invention; and the expression SQRT ( ) is the square root of the value in brackets ( ).

In a strict sense, this relationship applies in particular to thin glass substrates having a thickness from 0.3 mm to 2.6 mm. However, thin glass substrates with a greater thickness than 2.6 mm also exhibited a similar behavior.

Thus, in the case of a borosilicate glass, the method described herein for producing a thin glass substrate permitted to have a formation of elevations on one of the main surfaces of the thin glass substrate, in particular elongated elevations substantially rising in normal direction and preferably having a longitudinal extension greater than twice, preferably three times, most preferably five times the transverse extent of the elevation, which had a height H of less than 85 nm, preferably less than 75 nm, most preferably less than 65 nm on an arithmetic mean, averaged over an analysis surface area of 10*10 cm², preferably in the center of a hot-formed glass ribbon perpendicular to the drawing direction, adjusted for wedge-shaped variations in thickness and warpage, and with a transverse extent of the elevation of 40 mm in each case.

Not only the averaged values, but also the distribution of the absolute values was considerably improved by the method of the invention.

With the method for producing a borosilicate glass thin glass substrate, the borosilicate glass thin glass substrate 54 essentially had a wedge-shaped thickness variation K with a value of less than 40 µm over a length of 1 m perpendicular to the drawing direction, i.e. in the X-direction. Furthermore, the thin glass substrate 54 exhibited a warpage V due to the hot forming with a value of less than 300 µm over a length of 1 m perpendicular to the drawing direction, i.e. in the X-direction.

In the above description, all averages, including those of the third and fourth series of measurements were arithmetic averages made over the respective analysis surface area 52, wherein an analysis and averaging surface area of 18*18 cm² was used for the thickness measurement, i.e. the measurement of varicose thickness deviation, and an analysis or averaging surface area of 10*10 cm² was used for the measurement of the height H of the elevations only on the main surface 53.

The hot forming method described above allowed to obtain the borosilicate glass thin glass substrate 54 with an average thickness between 0.3 mm and 2.6 mm, averaged over a surface area of the first and second main surfaces of the thin glass substrate 54 of at least 10 cm 10 cm.

However, further preferred embodiments of the borosilicate glass thin glass substrate 54 with a thickness from 0.7 to 2.5 mm were also obtained, as well as particularly preferred embodiments with a thickness of approximately 0.7 mm or a thickness of approximately 2.54 mm. Furthermore, the method according to the invention even permitted to produce glass substrates with a thickness of up to 10 mm or even a thickness of up to 12 mm.

LIST OF REFERENCE NUMERALS

1 Apparatus for producing floated glass, float system
1' Apparatus for producing a thin glass substrate according to the invention, float system
2 Melting tank or melting furnace
2' Melting tank or melting furnace
3 Glass batch
4 Burner
5 Molten glass
6 Channel of melting tank
6' Channel of melting tank
7 Float bath, in particular tin bath
7' Float bath, in particular tin bath
8 Molten glass to be hot formed
9 Float bath furnace
9' Float bath furnace
10 Burner
11 Inlet lip, lip stone, or spout
12 Top roller
12' Top roller
13 Glass ribbon
14 Annealing lehr
15 Burner 16 Device for melting
17 Throughput control component, control gate, tweel
18 Device for defined adjustment of viscosity
19 Chamber
20 Fluid flow area
21 Fluid flow area
22 Wall of chamber 19
23 Wall of chamber 19
24 Wall of chamber 19
25 Wall of chamber 19
26 Sensing unit
27 Crossbar
28 Crossbar
29 Crossbar
30 Crossbar
31 Crossbar
32 Bay or trough section 1
33 Bay or trough section 2
34 Bay or trough section 3
35 Bay or trough section 4
36 Bay or trough section 5
37 Bay or trough section 6
38 Top roller
39 Top roller
40 Top roller
41 Top roller
42 Top roller
43 Top roller
44 Top roller
45 Wall of channel 6'
46 Wall of channel 6'
47 Device for hot forming
48 Arrow at a location upstream of tweel 17 and upstream of lip stone 11 or spout 11
49 Arrow at the location corresponding to the downstream end of tweel 17, i.e. the location immediately downstream tweel in the flow or drawing direction
50 Arrow at a distance of 1.5 m, corresponding to the upstream end of bay 1 in the flow or drawing direction
51 Arrow at a distance of 12 m, corresponding to the upstream end of bay 4 in the flow or drawing direction
52 Field of analysis
53 Upper main surface
54 Thin glass substrate
55 Drawing streak
56 Drawing streak
57 Drawing streak
58 Drawing streak
59 Laminated glass pane
60 First glass sheet
61 Polymeric layer
62 Second glass sheet
63 Outwardly facing surface of second glass sheet 62
64 Outwardly facing surface of first glass sheet 60
65 Reflection surface for a head-up display on the outwardly facing surface 63 of second glass sheet 62
66 Double arrow
M Center line of the glass or glass ribbon in X-direction
D Thickness of thin glass substrate 54
K Substantially wedge-shaped thickness variation in thin glass substrate 54
$K_{L1}$ Contour line of substantially wedge-shaped thickness variation K of thin glass substrate 54
$K_{L2}$ Contour line of substantially wedge-shaped thickness variation K of thin glass substrate 54
$K_{L3}$ Contour line of substantially wedge-shaped thickness variation K of thin glass substrate 54
V Warpage of thin glass substrate 54
$V_{L1}$ Contour line of warpage V of thin glass substrate 54
$V_{L2}$ Contour line of warpage V of thin glass substrate 54
H Height of elevation or drawing streak
$H_{old}$ Height of elevation or drawing streak of a prior art thin glass substrate
$H_{new}$ Height of elevation or drawing streak of a thin glass substrate hot formed by the presently disclosed method
$O_p$, Surface of an ideally plane thin glass substrate
Q Transverse extent of an elevation or drawing streak transversely, in particular perpendicular to the longitudinal extension of the elevation or drawing streak

What is claimed is:

1. A method for producing a glass substrate, comprising:
melting glass components to form a glass melt;
adjusting a viscosity ($\eta$) of the glass melt upstream of a throughput control component or tweel by cooling;
adjusting a viscosity $\eta_1$ of the glass melt at a distance $y_1$ that is less than or equal to 1.5 m from a location immediately downstream of the throughput control component or tweel, by cooling and according to the following equation:

$$lg\eta_1(y_1)/dPa\cdot s=(lg\eta_{01}/dPa\cdot s+a_1(y_1))$$

where $\eta_{01}$ is a value of glass viscosity at y=0 m and lg $\eta_{01}$ is a logarithm of the glass viscosity $\eta_1$ at y=0 m,
0 m≤$y_1$≤1.5 m being a distance of the location immediately downstream of the flow rate control component that is located at y=0 m,
3.75≤lg $\eta_{01}$/dPa·s≤4.5 being the range of viscosities to be adjusted at y=0 m, and
$a_1(y_1)$=1.00/m*$y_1$, being a positive change in the range of viscosities to be adjusted over 0 m≤y1≤1.5 m;
delivering the glass melt to a forming device; and
forming the glass melt to form the glass substrate by a forming process that comprises a drawing process that causes a formation of drawing streaks on a main surface of the glass substrate,
wherein the drawing streaks comprise elevations that rise in a normal direction, have a longitudinal extent that is greater than two times a transverse extent of the elevations, and have a mean height that is less than 100 nm.

2. The method of claim 1, wherein the viscosity of the glass melt is adjusted upstream of a lip stone or spout.

3. The method of claim 1, further comprising:
adjusting viscosity $\eta_2$ of the glass melt at a distance $y_2$ in a range from 12 m to 16 m downstream of the throughput control component or tweel so that:
the following equation applies:

$$lg\eta_2(y_2)/dPa\cdot s=(lg\eta_{02}/dPa\cdot s+a_2(y_2))$$

with 12 m≤$y_2$≤16 m,
7.05≤lg $\eta_{02}$/dPa·s≤7.6, and
$a_2(y_2)$=0.788/m*($y_2$−12 m) being a positive change in the range of viscosities to be adjusted over 12 m≤$y_1$≤16 m.

4. The method of claim 1, wherein the drawing process comprises a process selected from a group consisting of a float process, a down-draw process, a fusion process, and an overflow fusion down-draw process.

5. The method of claim 1, wherein the glass melt is selected from a group consisting of an Li—Al—Si glass, an Al—Si glass, a K—Na—Si glass, and a borosilicate glass.

6. The method of claim 1, wherein the glass melt is a borosilicate glass comprising the following constituents (in wt %):

| | |
|---|---|
| $SiO_2$ | 70-87 |
| $B_2O_3$ | 7-25 |
| $Na_2O + K_2O$ | 0.5-9 |
| $Al_2O_3$ | 0-7 |
| CaO | 0-3. |

7. The method of claim 1, wherein the glass melt is a borosilicate glass comprising the following composition:

| | |
|---|---|
| $SiO_2$ | 70-86 wt % |
| $Al_2O_3$ | 0-5 wt % |
| $B_2O_3$ | 9.0-25 wt % |
| $Na_2O$ | 0.5-5.0 wt % |
| $K_2O$ | 0-1.0 wt % |
| $Li_2O$ | 0-1.0 wt %. |

8. The method of claim 1, wherein the glass melt is an alkali borosilicate glass comprising the following composition:

| | |
|---|---|
| $SiO_2$ | 78.3-81.0 wt % |
| $B_2O_3$ | 9.0-13.0 wt % |
| $Al_2O_3$ | 3.5-5.3 wt % |
| $Na_2O$ | 3.5-6.5 wt % |
| $K_2O$ | 0.3-2.0 wt % |
| CaO | 0.0-2.0 wt %. |

9. The method of claim 1, wherein the glass melt is an Li—Al—Si glass with a $Li_2O$ content from 4.6 wt % to 5.4 wt %, an $Na_2O$ content from 8.1 wt % to 9.7 wt %, and an $Al_2O_3$ content from 16 wt % to 20 wt %.

10. The method of claim 1, wherein the forming step causes a substantially wedge-shaped thickness variation K of the glass substrate with a value of less than 100 μm perpendicular to a drawing direction and/or wherein the forming step causes a warpage V of the glass substrate with a value of less than 600 μm perpendicular to the drawing direction.

11. The method of claim 1, wherein the forming step provides the glass substrate with an average thickness from 0.3 mm to 2.6 mm.

12. The method of claim 1, wherein the forming step has a throughput of less than 400 tons of glass per day with a fraction of quality glass that amounts to more than 15% of a total glass throughput.

* * * * *